US006594488B1

United States Patent
Chow et al.

(10) Patent No.: US 6,594,488 B1
(45) Date of Patent: *Jul. 15, 2003

(54) METHOD AND APPARATUS FOR OVER-THE-AIR ACTIVATION OF NEIGHBORHOOD CORDLESS-TYPE SERVICES

(75) Inventors: Albert Chow, Hillsdale, NJ (US); Spencer Wang, Parsippany, NJ (US); Wenchu Ying, Cedar Knolls, NJ (US)

(73) Assignee: AT&T Corp., New York, NY (US)

( * ) Notice: Subject to any disclaimer, the term of this patent is extended or adjusted under 35 U.S.C. 154(b) by 60 days.

This patent is subject to a terminal disclaimer.

(21) Appl. No.: 09/223,318

(22) Filed: Dec. 30, 1998

(51) Int. Cl.[7] .................................................. H04Q 7/20
(52) U.S. Cl. ........................ 455/426; 455/411; 455/462
(58) Field of Search ................................ 455/406, 407, 455/408, 409, 410, 411, 412, 435, 437, 440, 443, 444, 426, 462, 74.1, 456, 465

(56) References Cited

U.S. PATENT DOCUMENTS

| 4,456,793 A | | 6/1984 | Baker |
| 5,159,625 A | | 10/1992 | Zicker |
| 5,295,180 A | | 3/1994 | Vendetti et al. |
| 5,345,499 A | | 9/1994 | Benveniste |
| 5,404,574 A | | 4/1995 | Benveniste |
| 5,457,736 A | | 10/1995 | Cain et al. |
| 5,513,379 A | | 4/1996 | Benveniste et al. |
| 5,535,260 A | | 7/1996 | Zicker et al. |
| 5,592,470 A | | 1/1997 | Rudrapatna et al. |
| 5,594,782 A | | 1/1997 | Zicker et al. |
| 5,600,706 A | | 2/1997 | Dunn et al. |
| 5,673,306 A | * | 9/1997 | Amadon et al. ............... 379/88 |
| 5,675,629 A | * | 10/1997 | Raffel et al. ................. 455/456 |
| 5,687,218 A | * | 11/1997 | Nakayama ................... 455/507 |
| 5,703,934 A | * | 12/1997 | Zicker et al. ............... 455/33.1 |
| 5,740,536 A | | 4/1998 | Benveniste |
| 5,758,288 A | | 5/1998 | Dunn et al. |
| 5,774,802 A | | 6/1998 | Tell et al. |
| 5,774,805 A | | 6/1998 | Zicker |

(List continued on next page.)

OTHER PUBLICATIONS

"TIA/EIA Interim Standard" Addendum No. 1 to TIA/EIA/IS-136.1-A, by Global Engineering Documents with the permission of EIA, pp. 14, 266, 332-332-40.

(List continued on next page.)

*Primary Examiner*—Edward F. Urban
*Assistant Examiner*—Tilahun Gesesse
(74) *Attorney, Agent, or Firm*—Banner & Witcoff

(57) ABSTRACT

A method for providing a neighborhood or local cordless service comprises the steps of receiving subscriber neighborhood zone selection input so that a mobile telephone equipped subscriber may place or receive calls for a fixed rate, for example, per month without having to pay radio frequency air time charges any time they are located within their selected subscribed-to zones. If the subscribed-to zones are adjacent to one another and the mobile subscriber roams from one zone to another, the subscriber may continue their free call uninterrupted and without paying air time charges. However, when the subscriber roams outside their subscribed-to zones they may be switched from the present neighborhood or local cordless services to conventional personal communications services and pay air time charges. However for an active call, no air-time charges are incurred as the user transitions between the cellular/DPCS environment and the neighborhood or local cordless service environment. Associated apparatus comprises an IBS for automatically changing radio frequency channels as the subscriber roams within a subscribed-to neighborhood zone, roams to another subscribed-to zone or roams outside a subscribed-to zone. Subscribers may choose to use their mobile identification number, their current directory telephone number for wired public switched telephone service or obtain a new directory number. Subscribers can actuate their service over-the-air automatically without service personnel assistance from their home neighborhood zone.

15 Claims, 14 Drawing Sheets

U.S. PATENT DOCUMENTS

| | | | |
|---|---|---|---|
| 5,787,352 A | | 7/1998 | Benveniste |
| 5,787,354 A | * | 7/1998 | Gray et al. ................. 455/456 |
| 5,809,423 A | | 9/1998 | Benveniste |
| 5,812,950 A | | 9/1998 | Tom |
| 5,819,180 A | | 10/1998 | Alperovich et al. |
| 5,832,378 A | | 11/1998 | Zicker et al. |
| 5,862,475 A | | 1/1999 | Zicker et al. |
| 5,873,037 A | | 2/1999 | Zicker et al. |
| 5,878,339 A | | 3/1999 | Zicker et al. |
| 5,878,344 A | | 3/1999 | Zicker |
| 5,887,254 A | * | 3/1999 | Halonen ..................... 455/419 |
| 5,905,953 A | * | 5/1999 | Liu et al. .................... 455/433 |
| 5,907,802 A | * | 5/1999 | Scott .......................... 455/406 |
| 5,918,172 A | | 6/1999 | Saunders et al. |
| 5,940,755 A | * | 8/1999 | Scott .......................... 455/426 |
| 5,943,425 A | * | 8/1999 | Mizikovsky ................ 455/411 |
| 5,950,130 A | * | 9/1999 | Coursey ..................... 455/432 |
| 5,960,356 A | | 9/1999 | Alperovich et al. |
| 5,987,318 A | | 11/1999 | Alperovich et al. |
| 5,995,829 A | * | 11/1999 | Broderick ................... 455/418 |
| 6,018,652 A | | 1/2000 | Frager et al. |
| 6,029,066 A | * | 2/2000 | Despres ...................... 455/419 |
| 6,047,071 A | * | 4/2000 | Shah .......................... 455/410 |
| 6,064,880 A | * | 5/2000 | Alanara ...................... 455/419 |
| 6,073,015 A | | 6/2000 | Berggren et al. |
| 6,141,544 A | * | 10/2000 | Corriveau et al. .......... 455/411 |
| 6,144,849 A | * | 11/2000 | Nodoushani et al. ....... 455/419 |
| 6,148,197 A | * | 11/2000 | Bridges et al. ............. 455/432 |
| 6,154,650 A | * | 11/2000 | Abidi et al. ................ 455/462 |
| 6,167,261 A | | 12/2000 | Amin |
| 6,167,279 A | | 12/2000 | Chang et al. |
| 6,236,860 B1 | | 5/2001 | Hagting et al. |
| 6,243,572 B1 | * | 6/2001 | Chow et al. ................ 455/463 |
| 6,263,211 B1 | * | 7/2001 | Brunner et al. ............. 455/464 |

OTHER PUBLICATIONS

"DIVA–2000 Wireless Local Loop", Diva Communications taken from www.diva.com/product.htm, pp. 1–5, printed Sep. 28, 1998.

"The OptaPhone 2000 Plus–2", OptaPhone 2000 Wireless Point–to–Point Telephone Systems, taken from www.asis-.com/optaphone/plusss.html, pp. 1–6, printed Sep. 25, 1998.

"Wireless Communications Industry Survey", Wireless Local Loop World taken from www.telecomresearch.com, pp. 1–2, printed on Sep. 25, 1998.

"OptaPhone Systems Overview", OptaPhone Systems Overview: Products, Markets and Customers taken from www.a-sis.com/optaphone/osoview.html, pp. 1–6, pp. 1–7, printed Sep. 25, 1998.

* cited by examiner

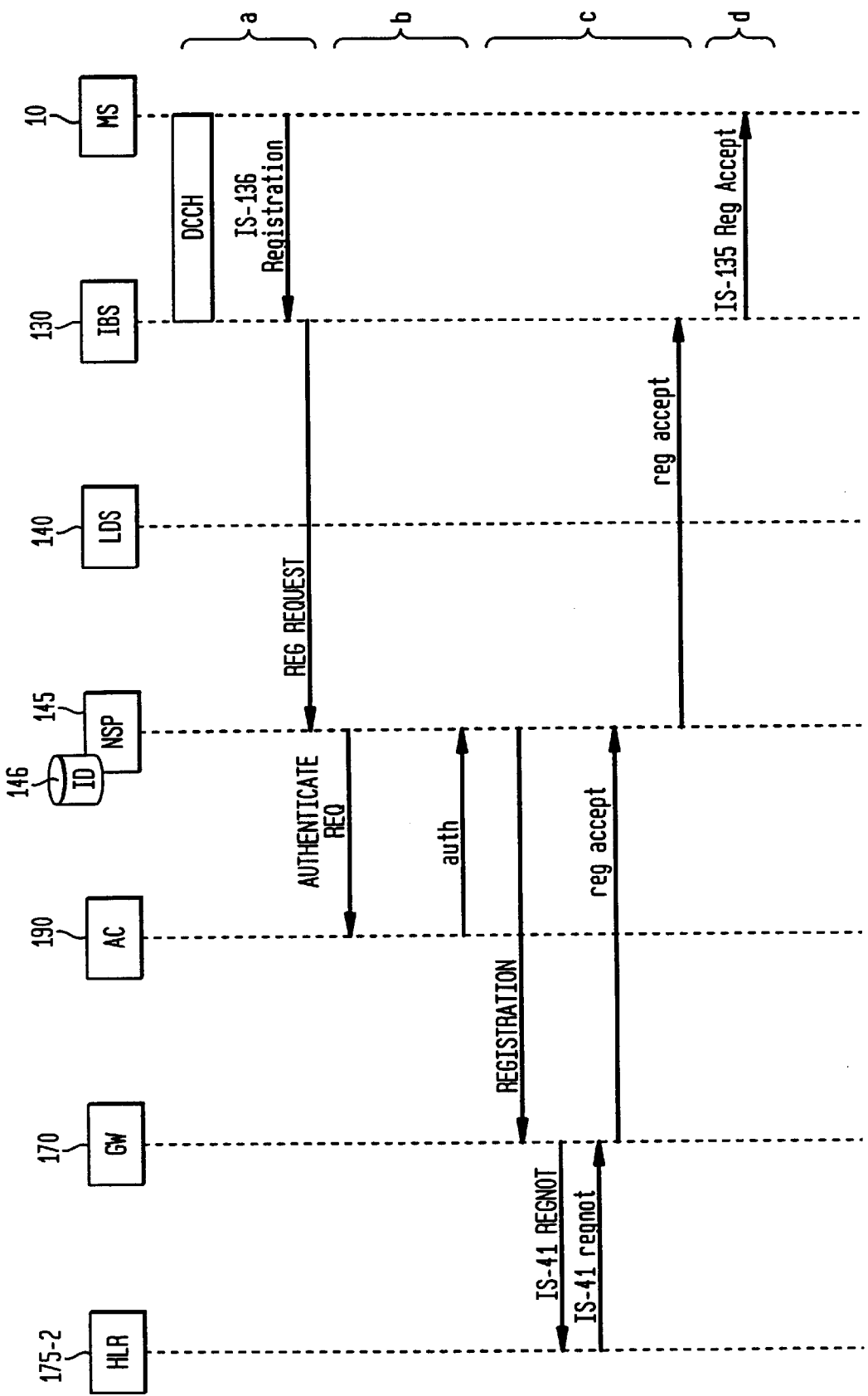

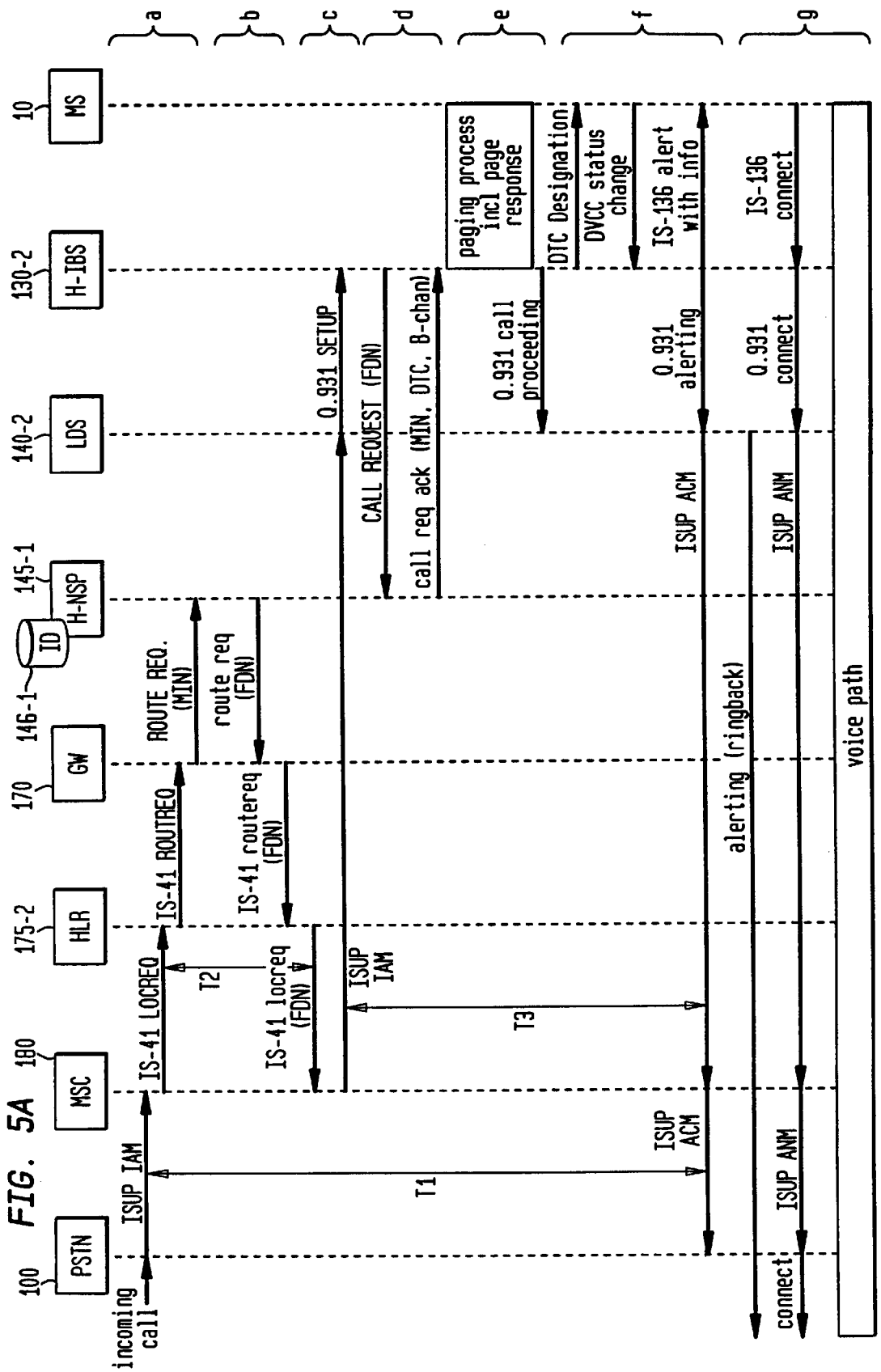

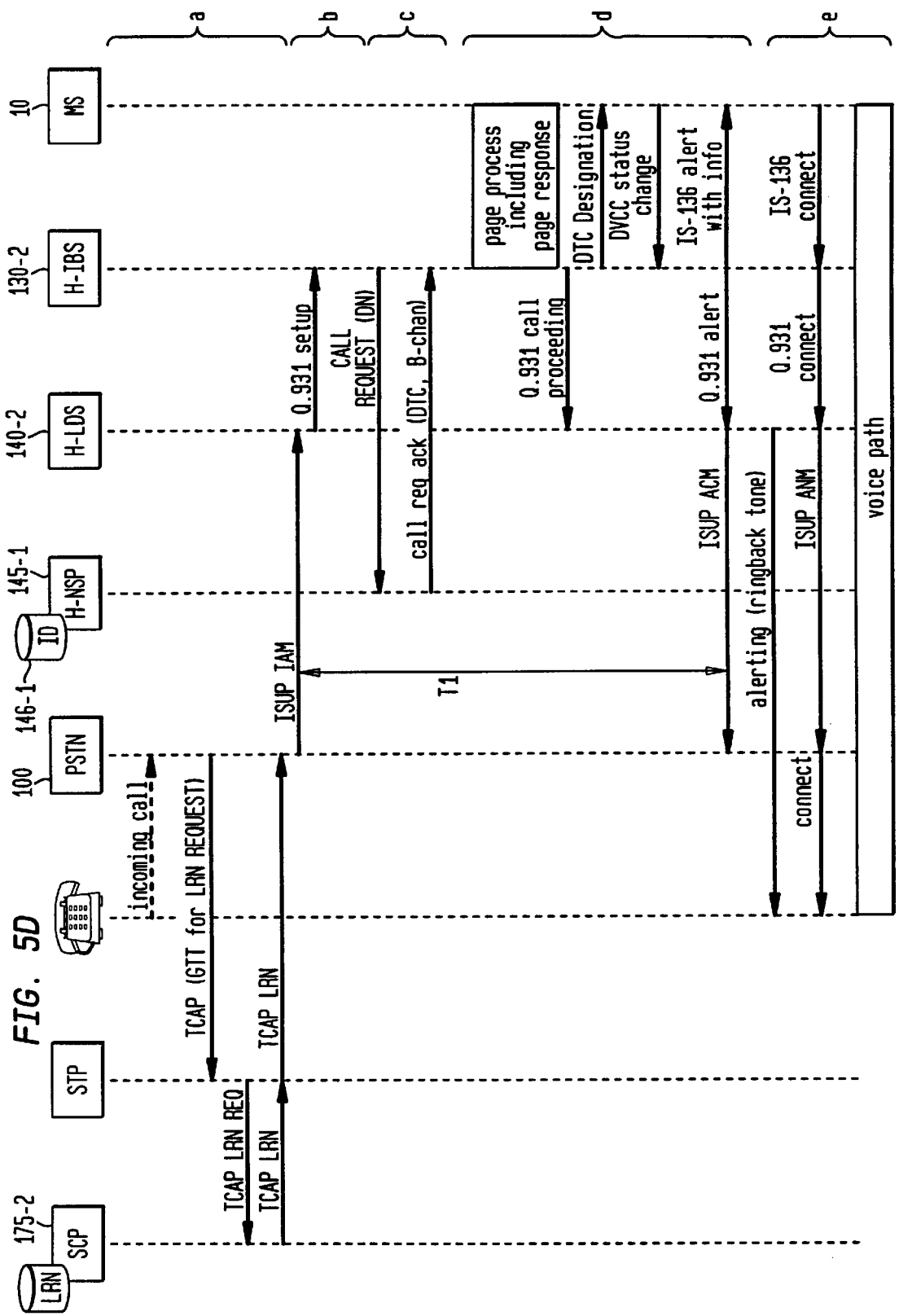

METHOD AND APPARATUS FOR OVER-THE-AIR ACTIVATION OF NEIGHBORHOOD CORDLESS-TYPE SERVICES

BACKGROUND OF THE INVENTION

1. Technical Field

This invention relates to the field of providing neighborhood cordless services at a single rate such that there is no air time charge for calls made within a home neighborhood zone or subscribed-to visiting neighborhood zone(s), and, more particularly to a method of activating such services over-the-air without any need for service personnel assistance.

2. Description of the Related Arts

It is known to provide wireless services for a fixed fee and to charge additional air time fees for each period of time that a subscriber to the wireless services is using the radio frequency spectrum. Such services were initiated in the 1970's as analog wireless services and have become digital over time, for example, the relatively new digital personal communications services (DPCS).

It has been known up until recently to permit users to have cordless telephone apparatus comprising a base station and a mobile unit such that the mobile unit may communicate with the base station over limited distances of several hundred feet. Recently, in the United States, however, a band of frequencies has been made available in the 900 MHZ range for providing cordless telephone service where the mobile station can be as far removed from the base station portion of the station apparatus by as much as one mile under optimal conditions. Consequently, a user would not have to pay for air time charges as in wireless services such as personal communications services if a mobile station is confined within one mile radius of the typically home-located base station.

Fixed wireless subscriber loop services are also known. Equipment for providing such services is available from suppliers such as Diva Communications and OptoPhone Systems. The fixed wireless subscriber loop concept has been used successfully to provide telephone services to remote, for example, mountainous regions. To provide a copper wire subscriber loop to such customers can cost hundreds of thousands of dollars per subscriber. Subscribers to a fixed wireless subscriber loop system have an antenna mounted to their home or business and receive an equivalent of wired services over a wireless link to an antenna site, for example, on the top of the mountain. Service can be provided for a fixed rate, the copper subscriber wired loop eliminated and no air time charges are charged.

There is still a need in the art for a wireless service that would permit a mobile subscriber to roam within a zone close to their home in the same way as a 900 MHZ cordless customer is free to carry their cordless phone from room to room. A mobile subscriber should be able to roam and also move from one zone to another or make calls from non-contiguous zones without having to pay for air time charges. In today's cellular environment, air-time is charged. The current fee structure thus has very little incentive for customers to continue to use their cellular phones when they have access to a home-based landline phone. In order to achieve the objectives of one phone, one number anytime and anywhere communications, it is imperative that a neighborhood or local 'cordless-type' of services be provided to all the public cellular/PCS subscribers and with incentive to use the same PCS phone in the home/office and around the neighborhood area without air time charges. A subscriber should not lose a call in progress as they move from one subscribed-to zone to another adjacent subscribed zone, and should have the opportunity to switch automatically to known DPCS services and pay air time charges should they so choose. A subscriber to such services should be able to activate their service over-the-air from their subscriber to home neighborhood zone without having to obtain service personnel assistance.

TIA/EIA Interim Standard—Addendum No. 1 to TIA/EIA/IS-136.1-A provides suggested messages for an over-the-air activation teleservice, which permits a subscriber to activate cellular service without the intervention of a third party. There is provision for point-of-sale data entry or preregistration so that a subscriber may be properly validated. Nevertheless, these suggested messages should be preferably supported in an over-the-air activation service.

SUMMARY OF THE PRESENT INVENTION

Subscribers to a neighborhood or local cordless service according to the present invention may subscribe to a home neighborhood zone and optionally one or more visiting neighborhood zones from which the subscribers may place telephone calls without having to pay air time charges. By neighborhood or local cordless service is intended a mobile wireless subscriber loop service wherein stations are mobile and the subscriber loop to the customer's premises may be replaced with a wireless loop. The subscriber need not maintain their wired connection to a local exchange carrier (LEC). If the subscribers are current public digital PCS service users, they may use their existing cellular phone and unique mobile identification number (MIN) for subscription to the service. Subscribers may also have the option of electing new wireline numbers to be assigned to their cellular phone for subscription of the service and the numbers assigned may be the traditional PSTN directory number (DN). Alternatively, the subscribers can elect to port their existing wireline DNs to this service. If the subscriber is not a public cellular user, they will need a cellular phone or other mobile station (MS) assigned with either a new DN or their ported DN from the incumbent local exchange carrier (ILEC).

The subscriber buys their phone at a retail outlet and the retail outlet records the purchase in a service provider database. The point-of sale information may include subscriber name, address, credit card number, unique mobile station identification number (MSID), optional personal identification number (PIN) and other verification numbers. Alternatively or in addition, the subscriber may preregister for services with their network service provider of choice. The user initiates their service by activating their phone over-the-air when they first communicate from their selected home neighborhood zone. A feature code comprising a part of the over-the-air activation message may comprise one or more of a uniquely chosen sequence of bits, a manufacturer's electronic serial number and a personal identification number (PIN) selected by the user. The system automatically verifies the user by comparing the point-of-sale/preregistration information with the information input by the subscriber from their home neighborhood zone. Over-the-air activation occurs without the assistance of service personnel.

According to one embodiment of the present invention, a subscriber to such a mobile service pays a flat rate that is competitive with or even less expensive than a subscriber to conventional wired public switched telecommunications services. In their home zone, which may be approximately the same size as, or even slightly larger in size than, the range of a standard 900 MHZ cordless phone, the subscriber may carry or otherwise receive services at one flat rate (regardless of air time used). For additional flat fees, the subscriber may also make calls in one or more visited zones which may be contiguous with or remote from the home zone.

When a subscriber travels between the subscribed home zone and an adjacent visiting zone or between adjacent visiting zones, the call may be handed off to the other zone without interruption to the call in progress. Also, when a subscriber moves from any subscribed zone to a public cellular/PCS environment, the call may be handed off without air time charges for the duration of the same call.

As a subscriber leaves their home zone and roams toward a remote (i.e., non-adjacent) visited zone, there exist at least three alternative ways of billing a call in progress. In one embodiment, the call in progress will be terminated when the boundaries of the subscribed-to zone are reached. In another embodiment, the call will be allowed to continue without air time charges for a predetermined period of time as a public cellular carrier (e.g., a conventional digital personal communications service call). In this invention the preferred method is to allow the call to continue but the subscriber will be switched over to public cellular carrier frequency without air-time charges for the duration of the same call These and other features of the present invention will be understood from studying the drawings and the following detailed description of various embodiments.

BRIEF DESCRIPTION OF THE DRAWINGS

FIG. 4a shows an exemplary call processing flow for registration of a mobile station with a mobile identification number (MIN) in its associated home neighborhood zone (HNZ).

FIG. 5a shows an exemplary call processing flow for a call delivered to a mobile station with a mobile identification number (MIN).

FIG. 5d shows an exemplary call processing for a ported DN based subscriber in their HNZ.

DETAILED DESCRIPTION

Figure 1:
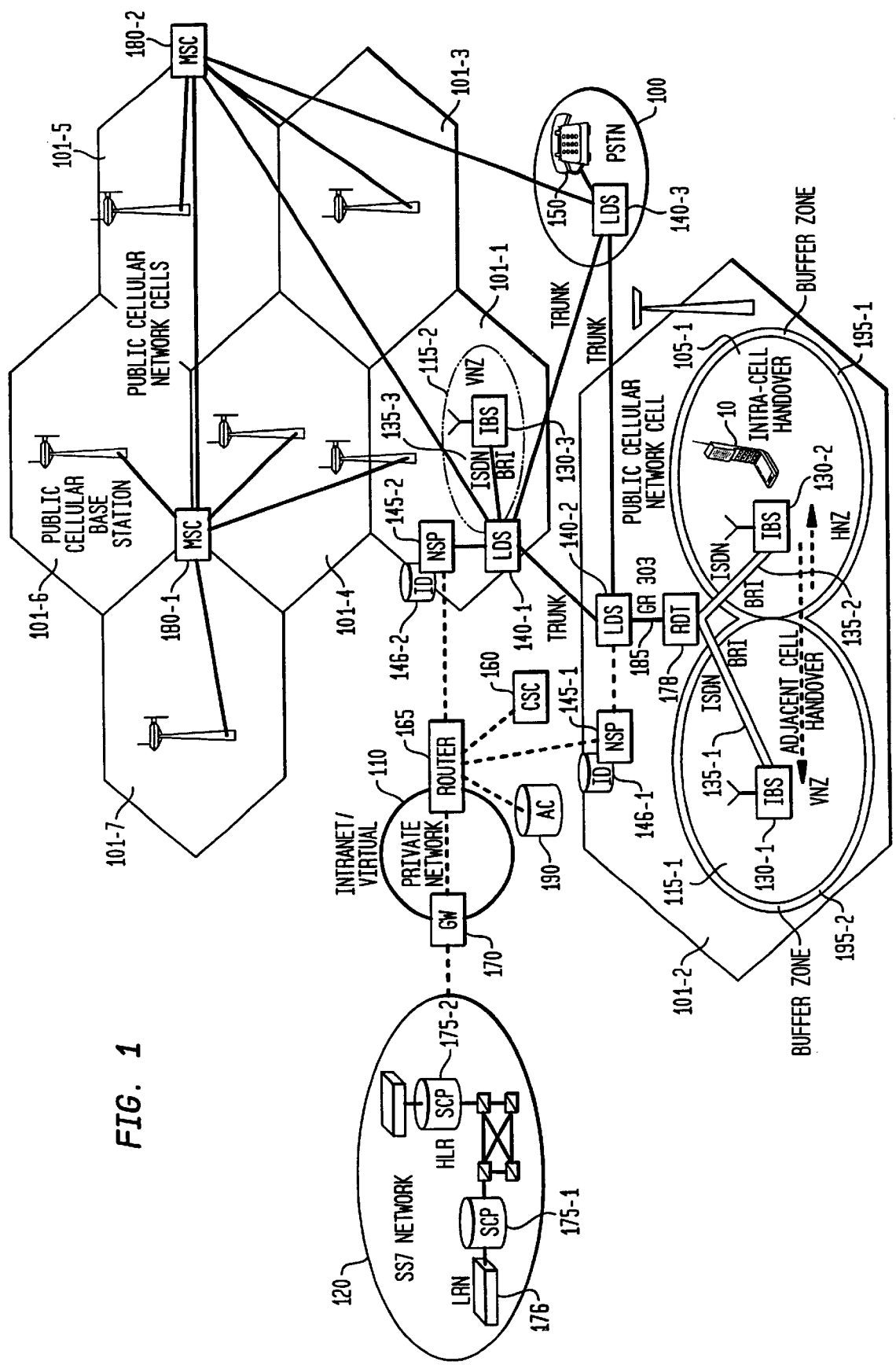
FIG. 1 is a functional block schematic drawing of an exemplary network archiecture for providing Local Cordless Services (LCS) and for describing call processing.

Referring to FIG. 1, there is shown an exemplary system architecture for providing local cordless services (LCS) according to the present invention. LCS according to the present invention essentially provides a mobile wireless subscriber loop. If a subscriber so chooses, the subscriber may disconnect their wired telephone service provided by their incumbent local exchange carrier (ILEC) and utilize their same directory number (DN) via the present neighborhood or local cordless service. The system architecture of FIG. 1 may be overlaid on an existing public switched telephone service network (PSTN) 100 shown above and to the right of a public cellular network cell 101-2 of known cellular wireless service (WS). The LCS service may likewise be overlaid and be provided from the same antenna sites as a conventional cellular wireless service or personal communications service. It is envisioned that the LCS radio equipment (IBS) 130-1, 130-2 can also be attached to telephone poles. For ease of understanding, FIG. 1 presents the PSTN 100 as a separate network entity away from the LCS. Thus, FIG. 1 is simplified to the extent that the conventional wired PSTN 100 may actually surround and include a neighborhood or local cordless services network according to the present invention in much the same way that today a PSTN network 100 surrounds and includes a typical cellular mobile wireless service (WS) network comprising cells 101-1 to 101-7 or digital personal communication service (DPCS) network. As will be further described herein, the LCS service network defines a plurality of neighborhood zones, which may comprise home neighborhood zones (HNZs) 105-1 and visiting neighborhood zones (VNZs) 115-1, 115-2 from the point of view of an individual subscriber to the LCS service of the present invention.

In fact, the present LCS service may utilize WS, PCS, and/or DPCS infrastructure such as antenna sites and subscriber apparatus. One advantage of the LCS service is its efficient use of the surrounding network's bandwidth capacity. As will be further described herein, unused channels in the 800 MHZ and 1800 MHZ spectra for WS, PCS, and/or DPCS service may be dynamically allocated to LCS service as taught by U.S. Pat. No. 5,809,423 (issued Sep. 15, 1998), U.S. Pat. No. 5,787,352 (issued Jul. 28, 1998), U.S. Pat. No. 5,740,536 (issued Apr. 14, 1998), U.S. Pat. No. 5,513,379 (issued Apr. 30, 1996), U.S. Pat. No. 5,404,574 (issued Apr. 4, 1995), and U.S. Pat. No. 5,345,499 (issued Sep. 6, 1994), all issued to B. Mathilde et al., which are all incorporated by reference herein in their entireties. Moreover, as taught by these patents, the radio frequency cells may be dynamically configured according to algorithms described therein.

LCS service also differs from current cellular/DPCS service in that the LCS radio equipment interfaces to a local digital line switch and not to a mobile switching center. The local switch provides bearer channels and feature applications as well as the switching fabric for wired lines. The mobile switching center provides comparable capabilities to the cellular/DPCS network. Utilizing a local digital line switch enables LCS to provide feature applications to the LCS subscriber currently available to wired telephony but unavailable via the MSC 180 in wireless telephony. Another feature of LCS is that the LCS radio equipment, the IBS, 130-1, 130-2, 130-3 interfaces to the local switch via ISDN BRI lines and the IBS uses Q.931 signaling for call processing with the LDS 140-1, 140-2. IBS 130-1 and 130-2 interface via ISDN BRI lines to remote digital terminal RDT 178 which is a remote digital terminal for concentrating lines known in the art to a GR 303 line to LDS 140-2. IBS 130-3 communicates with LDS 140-1 via ISDN BRI 135-3. This interface is a widely supported open standard interface and thus the LCS radio equipment, for example, IBS 130-1, 130-2, 130-3, can interwork with any local switch that supports the integrated services digital network (ISDN). Therefore LCS radio equipment appears to the switch as an ISDN terminal station and the radio equipment is responsible for terminating Q.931 protocol and establishing the RF link.

A subscriber 10 in a home neighborhood zone (HNZ) 105-1 of wireless service (WS) cell 101-2 may be a PSTN 100 service subscriber and have a hard-wired telephone (not shown) at their residence within the HNZ 105-1. Neighborhood or local cordless services according to the present invention are not limited by the extensive investment in copper cable distribution facilities which will be referred to herein as a wired subscriber loop. That copper investment (made in a PSTN 100 environment) is avoided with neighborhood or local cordless services according to the present invention. Thus, LCS service is expected to be less expensive to subscribers than conventional wired PSTN service.

Subscriber 10 to a copper-wired PSTN 100 may pay, for example, a fixed rate for telephone service each month and receive unlimited incoming calls within a local calling zone, for example, HNZ 105-1. The typical subscriber 10 may also place free outgoing calls from their residence within the same local calling zone.

Also, the present invention is comparable with the provision of conventional so-called 900 MHZ cordless handsets, which communicate with a wired home base station. While it is urged by proponents of such apparatus that such phones are portable and may be used as far away as one mile (or more) from associated home base stations, in practice, many such phones are not capable of operating further than hundreds of feet from their wired base stations, for example, because of unfortunate antenna location, the personal use of the mobile handset portion or the placement of the base station or handset portion within a radio frequency shielded residence or automobile or because of other environmental factors. Another limitation for using a 900 MHz phone is that free airtime can only be achieved when using it around the wired home base station. There is no such concept of visiting zone(s) 115-1, 115-2.

The Home Neighborhood Zone (HNZ)

According to the present invention, each subscriber with LCS mobile station (MS) 10 (this subscriber may or may not have a landline phone but must have a cellular phone or other mobile station (MS) in order to use the invention) will be given the opportunity to make calls free of air time charges anywhere within their home neighborhood zone 105-1. Subscriber MS 10 may roam throughout the home neighborhood zone and make calls for free within that zone. Another subscriber, for example, subscriber MS 150 may have a different home neighborhood zone that is defined by their residence location within that zone. The subscriber may be coincidentally located near the center of their HNZ 105-1 or toward its perimeter. The HNZ thus is a fixed geographic pattern that may have any desired shape surrounding an intelligent base station (IBS) and antenna site, in this example, IBS 130-2. The HNZ 105-1 may have other shapes as well, such as an elongated shape, to obtain, for example, a large calling and callable population of subscribers. For the purposes of this description and by way of example only a circle is shown in the drawing but such use of a circle should not be construed to be limiting. In one embodiment, the pattern may have a radius of between one and one half mile and two miles. In another embodiment, the pattern may have a radius of one half of a mile to one and one half mile, or two to 4 miles. In another embodiment, the HNZ 105-1 may have a diameter of as much as seven to ten miles. In another embodiment, the shape of the pattern in relation to the neighboring zones may be that of an ellipse. The design of HNZ's and visiting neighborhood zones (VNZ's) may be a process involving the calculation of frequent calling patterns and the desirability of inclusion within the zone of frequently called commercial and retail establishments. The design may become an art as well as a science. The concept, however, is clearly to provide at least equivalent service to 900 MHZ cordless telephone service and to provide better than equivalence with respect to the mobility of the phone with wired PSTN 100 service.

The Visiting Neighborhood Zone (VNZ)

The LCS service may comprise a first flat monthly rate for a home neighborhood zone 105-1 and permit additional air time free calling zones named herein as visiting neighborhood zones (VNZ) 115-1, 115-2 for an additional nominal flat rate per each additional visiting neighborhood zone. For subscriber MS 10 whose HNZ is zone 105-1, subscriber MS 10 may have one or more visiting neighborhood zones (VNZ) 115-1, 115-2. The VNZ need not be contiguous with the HNZ, for example, as VNZ 115-1 is contiguous with HNZ 105-1 and VNZ 115-2 is not contiguous with HNZ 105-1. The VNZ's may overlap other VNZ's or HNZ's more than is shown in FIG. 1. When loosely overlapping, for example, the buffer zone 195-1 within the HNZ or buffer zone 195-2 within VNZ 115-1 may provide subscriber with the ability to travel without loosing a connection between VNZ and VNZ or between HNZ and VNZ. The rate the subscriber must pay may vary with the subscribed-to visiting zone VNZ or simply be constant for each VNZ added. In another rate plan, the first VNZ may be offered at a given rate and the next VNZ may be added at a lesser additional flat rate. What may be a visiting neighborhood zone 115-1, 115-2 for one subscriber such as subscriber 10 will be a home neighborhood zone for another subscriber whose home is located within the zone. Each VNZ is designed in the same way and manner as an HNZ. For example, VNZ 115-1 surrounds IBS and antenna site 130-1 and VNZ 115-2 surrounds IBS and antenna site 130-3 in the same way as HNZ 105-1 surrounds IBS and antenna site 130-2.

The subscriber to LCS service need not select a VNZ for their service that is proximate to or overlaps their HNZ. Subscriber MS 10, for example, may choose VNZ 115-1 or the more remote VNZ 115-2 or both zones in addition to their HNZ 105-1. The subscriber, thus, may choose a VNZ 115-2 that is considerably remote from their HNZ such as a zone surrounding their place of employment, their school or the neighborhood of a family member. The VNZ selected may be a VNZ so remote from their HNZ that a call from their HNZ to the VNZ might be a toll call if it were a wired line PSTN service call.

When subscriber MS 10 roams from HNZ 105-1 into VNZ 115-1 by way of the labeled buffer zones, there will be no charge for airtime and the call in progress will be maintained. When subscriber 10 roams from HNZ 105-1 into VNZ 115-2, then, there is no overlapping buffer zone, the call in progress may or may not be maintained. If the LCS subscriber happens to be also a public PCS/cellular service subscriber, the call in progress is handed over to the public PCS/cellular system using public cellular spectrum frequency, there will be no air time charges for the duration of the same call. There exist at least three alternative embodiments for the subscriber 10 that travels outside an HNZ or a VNZ to which they have subscribed. These include 1) allowing the subscriber to continue the call they have initiated or have received without additional charge at least for a predetermined length of time, 2) disconnecting the subscriber from the connection they have for a given call after the subscriber leaves their HNZ or subscribed-to VNZ's or 3) allowing the call to continue outside their HNZ or subscribed-to VNZ's and billing the subscriber for the air time. When the subscriber is within the third alternative, the subscriber may receive a conventional wireless service such as DPCS. As a subscriber reached a borderline of a subscribed-to zone, the subscriber may see a lit warning lamp, and/or receive an audible or other alert to their status as is further described in copending application, U.S. patent application Ser. No. 09/223,320, entitled, "Automatic Status Indicators for Neighborhood Cordless Services," filed on the same day as present application and invented by A. Chow, R. Miller II, J. Russell, W. Ying, and S. Wang.

The buffer zone is inherent to each HNZ or VNZ. It is the area that defines the perimeter of the zone where service quality may not be at the optimal level, but service can still be rendered. (NOTE: "buffer zones" also exists in cellular/DPCS, they are just the periphery of a cell, the buffer zone is not unique to LCS.)

Intra-building Utilization of HNZ and VNZ, for example, by an Employer

The concept of HNZ and VNZ can be extended to providing an intra-building or intra-office complex LCS. LCS can be used to provide wireless intra-building communications. A home zone may be one location of a company and visiting zones may be frequently visited locations of the same company within the same company premises or another company premises. Service may be provided at one rate for all wireless use of a company owned phone or phone system at a company location. Moreover, in the spirit of U.S. Pat. No. 4,456,793, hereby incorporated by reference in its entirety, the service may be extended to comprising, for example, an infrared light link between the phones and the IBS and antenna sites. In one embodiment of LCS within a building, different floors of the building, hallways and certain radio frequency shielded or isolated rooms may be equipped with IBS and antenna sites. For example, one sector of one floor may be distinguished from a sector of another floor, if appropriate and depending on the application.

System Architecture

The LCS system architecture will now be described in further detail with reference to FIG. 1. The subscriber's MS 10 may be equipped with a typical DPCS or WS mobile telephone. A DPCS telephone in compliance with IS-136 is preferred in the present invention. Certain enhancements to the basic IS-136 design include audible, light (such as LED), and/or other means of alerting a subscriber of a change in service and/or other status. Without limiting any invention, and by way of example, a set of LEDs may present colored indications of red for no service, a green light for service A, such as conventional cellular or PCS service, a brown light for cellular roaming service and a blue light for service B, the LCS service. By "no service" is intended those times when the mobile telephone is powered and has received a user request, but the mobile station is not able to establish a connection with any service provider. When a subscriber is in their HNZ or VNZ, the station may first try to establish an LCS connection and if not possible, due to low signal strength or because the subscriber is out of a zone, the mobile station will try to establish a conventional WS, PCS or DPCS connection, and also can not establish a connection to these systems.

Another enhancement is the capability for the mobile phone to automatically select the appropriate service provider for the given coverage area. For example, if a customer is a subscriber to both cellular/DPCS and LCS service, it would be cumbersome for the user to remember when to select the correct service profile on their MS (for example, such as the IS-136 Number Assignment Module (NAM) A for cellular/DPCS service, and NAM B for LCS service.) The mobile phone working in conjunction with the cellular/DPCS or LCS network intelligence will determine the correct service profile (e.g., IS-136 NAM) that should be active thus permitting the user to transition between services seamlessly and accurately. In other words, whether a subscriber's MIN is ported or not, a subscriber MIN may have a plurality of allocated different services including cellular/DPCS and the present LCS. It will generally be the case that a subscriber will be a subscriber to cellular/DPCS and may not be a subscriber to LCS. But if a subscriber subscribes to LCS, it would be beneficial to also subscribe to DPCS so their MS 10 may be more universally usable.

A user subscribes to multiple wireless services and the MS 10 stores the service specific information (e.g., IS-136 NAM) to access the appropriate network. The network(s) associated with all the subscribed services also maintains a database ID 146 including the subscriber's profile, service subscription, service preferences and priorities. When the customer enters a coverage area and turns on their Mobile Station (MS), the MS 10 remembers the last service environment it registered and attempts to use the same profile with the current network. The network recognizes the customer and retrieves the subscriber profile from the database. Based on the user's current location information, the network determines the preferred service profile for the user. If the current coverage area offers the preferred service environment, the network accepts the registration and the MS is ready for service. If the preferred service environment is available in the coverage area but under another MS service profile, the network directs the MS to switch to that service profile. The MS retrieves the correct service profile data and registers for the new services. These services can be offered by the previously attempted network or by a new network. In either case, the (previously attempted or new) network will again determine if the user is in the correct service environment and using the right profile. If so, the network accepts the registration, the MS informs the subscriber of service (audibly and/or visually), and the subscriber begins to use the service.

Referring to subscriber 10 located in HNZ 105-1, there is shown an intelligent base station (IBS) and antenna site 130-2 at the center of the HNZ 105-1 with which subscriber 10 communicates via their DPCS or WS mobile station. The IBSs 130-1, 130-2 and 130-3 each may comprise a digital software radio station that supports an IS-136 based time division multiple access (TDMA) common air interface. For example, each IBS may support three TDMA frames (this comprises eight IS-136 digital traffic channels, a digital control channel) and four ISDN-BRI (basic rate interface 2B+D) lines for providing up to eight simultaneous telephone calls. Again by way of example, respective links 135-1 and 135-2 may couple IBS and antenna sites 130-1 and 130-2 to remote digital terminals (RDT) (only a single RDT 178 is shown by way of example), for traffic concentration or relay of the calls to a local digital switch (LDS) 140-2 via a GR 303 trunk interface 185, as appropriate. GR-303 relates, for example, to a known remote digital terminal (RDT) to local switch interface comprising an integrated digital loop carrier system and associated requirements. In an alternative embodiment, the IBS 130-3 may communicate directly via ISDN BRI link 135-3 to a local subscriber switch 140-1.

LDS 140-1 or 140-2 may preferably comprise any local digital switch known in the art including, but not limited to, a No. 5 ESS switch manufactured by Lucent Technologies, Inc., or a DMS-100 switch manufactured by Northern Telecom. These switches perform the switching function necessary to connect LCS subscribers to PSTN customers, WS customers, PCS or DPCS customers or other LCS subscribers wherever situated. A network server platform (NSP) (e.g., NSP 145-1, 145-2) of an LCS system may be an adjunct to each LDS 140-1 and 140-2. The NSP may preferably comprise a pair of fully redundant (i.e., for hot standby fault tolerance) Sun Sparc work stations available from Sun Microsystems or other comparable processor programmed as will be further described herein for registration, call processing, and/or call handoff. Each NSP will have an intelligent database (ID) containing subscriber profile information. Each site may be backed-up by an intelligent spare NSP and ID and program memory backed up on disc or other memory back-up. In FIG. 1, LDS 140-2 is coupled to NSP 145-1 and LDS 140-1 is coupled to NSP 145-2. Each NSP operates to effectively control all activities associated with subscriber registration, call setup and tear down, radio frequency engineering, handoffs, feature applications, and operation, administration and maintenance (OA&M) functions. Each respective NSP for a LDS manages all its subtending IBS's and antenna sites. In the depicted example, a single LDS 140-2 and NSP 145-1 may serve multiple neighborhood zones, in this instance, HNZ 105-1 and VNZ 115-1. The number of zones served by a single NSP need not be limited to two but may comprise 3 or more.

Preferably, all NSP's are linked together for communication via, for example, an IP-based LCS intranet or virtual private network (VPN) comprising a router 165. During operation, the IP-based network is utilized for passing call and subscriber registration, mobility management and LCS Operation Administration & Maintenance (OA&M) related information. Also coupled via the IP-based intranet or VPN are connections to an authentication center (AC) 190, to a LCS Customer Service Center (CSC) 160, a network management and operations center (not shown), and a operations support systems center (not shown).

Each NSP may have an associated intelligent database (ID). For example, intelligent database 146-1 is associated with NSP 145-1. The ID may store LCS subscriber profiles, which includes information regarding each LCS subscriber within the HNZ, such as subscribed features and/or calling preferences. The ID also uses the information for communication with other ID's in the event the subscriber has roamed to a VNZ not handled by the associated NSP. For example, in ID 146-1, there would exist subscriber profiles for all subscribers in neighborhood zones 115-1 and 105-1.

The LCS Customer Service Center (LCS CSC) 160 may provide a human or automated service representative interface to any potential or existing subscriber. Typically, the LCS CSC may comprise a known service representative position system or voice response system. The LCS CSC supports at least service registration of a MS from a retail location and/or a subscriber, activation for subscribers to LCS service and administration of service (for example, facility, trouble and billing queries).

The LCS authentication center (AC) 190 may be a shared resource of the LCS network as is the LCS CSC 160. As will be further described herein, a subscriber to LCS may preserve their directory numbers (DN) if they disconnect their wired PSTN number and connect to LCS service. The LCS AC 190 may utilize IS-136 cellular authentication voice encryption (CAVE) to assist in validating and authenticating subscribers and to provide voice privacy and encryption capabilities. ACAC Gateway (GW) 170 sits within the IP-based LCS intranet or VPN 110 and provides a TCP/IP data link to the SS7 network 120. This IP-based network, as explained above, provides access to and interworks with the home location register for registration of MIN-based LCS subscribers for delivery of calls, for example, from subscriber 150 to LCS subscribers within the neighborhood zones 115-1, 115-2 and 105-1. The GW 170 is responsible for the TCP/IP to SS7/TCAP protocol conversion between the SS7 network and the LCS network. The GW 170 is also responsible for global location management on a per NSP 145 location basis, for example, MIN-based call delivery. The AC 190 supports registration of subscribers, over-the-air activation and call hand-off.

For this invention, we use the radio frequency self-configuration algorithm known in, e.g., U.S. Pat. No. 5,809,423 (issued Sep. 15, 1998), U.S. Pat. No. 5,787,352 (issued Jul. 28, 1998), U.S. Pat. No. 5,740,536 (issued Apr. 14, 1998), U.S. Pat. No. 5,513,379 (issued Apr. 30, 1996), U.S. Pat. No. 5,404,574 (issued Apr. 4, 1995), and U.S. Pat. No. 5,345,499 (issued Sep. 6, 1994), all issued to B. Mathilde et al., and all hereby incorporated by reference in their entireties. This algorithm is designed to sniff and designate unused and interference-free traffic and control channels (such as IS-136 Digital Traffic Channels and digital control channels) from the public macrocellular network for use by an underlying/stacked cell use. The algorithm will also be able to detect when the public macrocellular network begins to use these channels, and will automatically adjust by re-selecting another unused frequency. This algorithm greatly simplifies the radio frequency engineering and deployment processes. Without this algorithm, the LCS service will need to reserve radio frequencies specifically for LCS use.

The Intelligent Base Station (IBS) and Antenna Site

Figure 2:
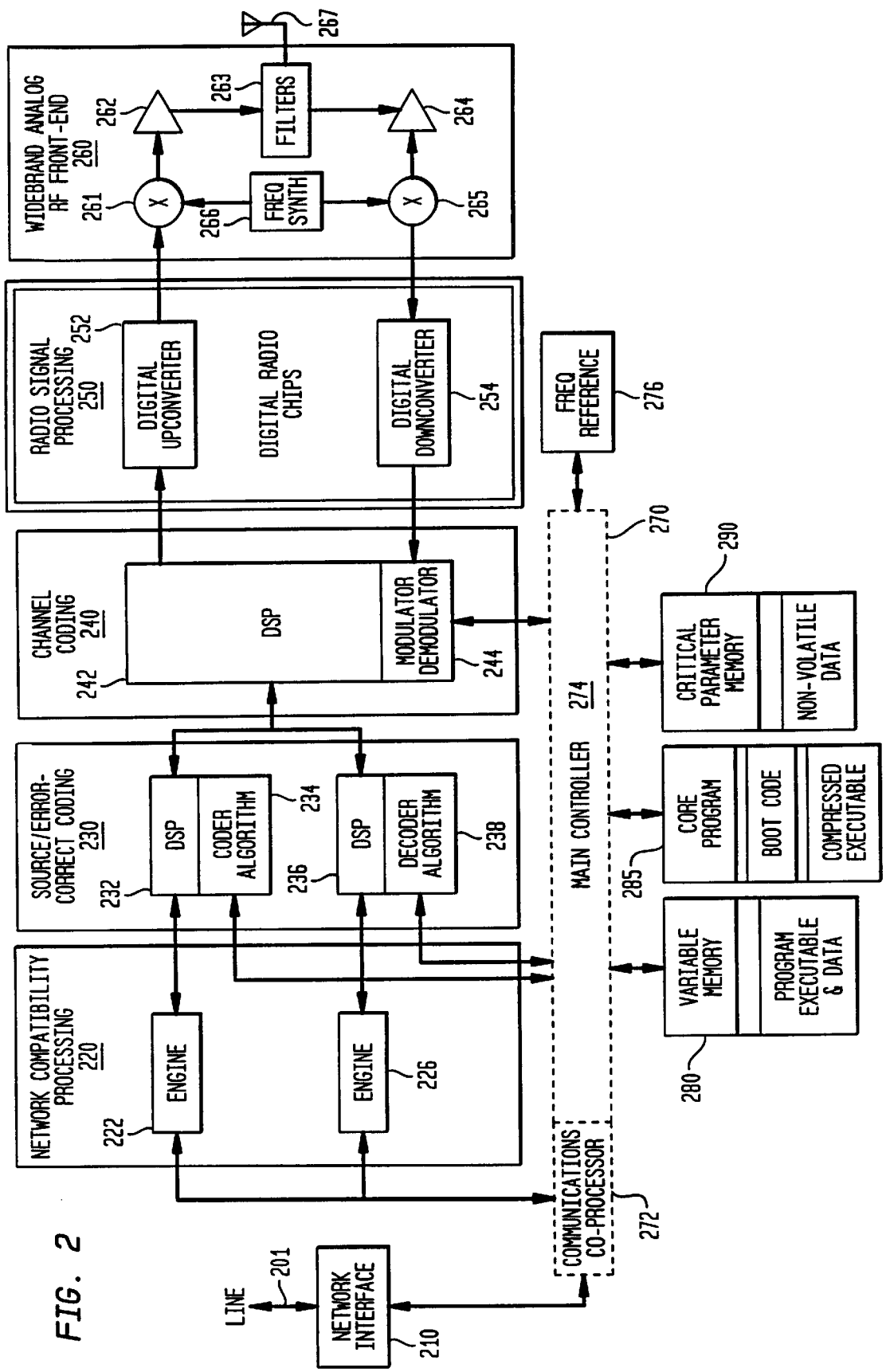
FIG. 2 is a functional block schematic drawing of the intelligent base station (130) shown in FIG. 1.

The intelligent base station (IBS) can be any currently existing radio base station that is known in the art. The IBS should be capable of performing automatic frequency allocation functions, which are known in the art. For this invention, the preferred embodiment further provides self-configuration in accordance with U.S. Pat. No. 5,724,665. Other patents utilized in the design of IBS 130 include U.S. Pat. Nos. 5,608,780; 5,592,470; 5,574,775 and 5,406,615. Referring to FIG. 2, there is shown a generalized software radio architecture for an IBS 130 shown in FIG. 1. Line 201 may be an ISDN BRI line as shown or other equivalent data line. Line 201, although not shown, may be coupled via a remote digital terminal 178 to a LDS 140 or directly to the switch per FIG. 1. Line 201 is connected to a communications processor of processing module 270. Communications processor 272 handles all wire line interface control functions. The communications processor is coupled to a network compatibility processing module for handling incoming and outgoing calls requiring either LCS or DPCS or other network compatibility. Main controller 274 is coupled to a source/error correction coding/decoding module 230 and a channel coding module 240. A frequency reference or clock 276 is divided to provide all the reference frequencies needed by any other module including channel coding module 240.

Associated with main controller 274 is variable memory 280, core program memory 285 and critical parameter memory 290. Program executable software and data are stored in variable memory 280. Boot code and compressed executable code are stored in core program memory 285 and non-volatile data are stored in critical parameter memory 290.

Network compatibility processing module 220 comprises a coding engine 222 and a decoding engine 226. Source/error correction coding module 230 comprises a digital signal processor 232 and coder algorithm for encoding and a digital signal processor 236 and decoder algorithm 236 for decoding. The channel coding module 240 contains a digital signal processor 242 for interfacing with the radio frequency processor 250 and includes a modulator/demodulator 244.

Radio signal processing module 250 contains a digital up converter 252 and a digital down converter 254. When up converting, the output is fed via a mixer 261 to an amplifier 262 for outputting via antenna 267 via filter 263. On the antenna receive side, the received signal is fed via filter 263 and amplifier 264 to mixer 265 and the result passed to digital down converter 254. Frequency synthesis circuit 266 provides frequencies at whatever channel frequencies are utilized at a particular point in time.

Antenna 267 may be a sectorized antenna system in one embodiment collecting and radiating energy in 800 MHZ and 1800 MHZ spectra or other suitable spectra. Each zone 105-1 may comprise several such as three sectors or small cells such that an intra-cell hand-off may be required (as will be discussed in connection with FIG. 6a).

Flexibility in Addressing a Subscriber

An LCS subscriber may elect to discontinue their current PSTN directory number (DN) and use that same number as their LCS address (i.e., Local Number Portability—LNP). Alternatively, the LCS subscriber may receive a new LCS directory number. A third option is for the LCS subscriber to use the mobile identification number (MIN) the subscriber may have as a subscriber to wireless cellular services or personal communications services.

On the air interface side, in this embodiment, each IBS has 9 full-rate TDMA channels. Note: Number of full rate channels for the IBS should be made as a variable for this patent, since the number of radio channels per radio port can be designed according to different services applications and coverage density requirements. IBS can provide as many radio channels as long as it meets the design and service deployment financial criteria. Among these channels, one full-rate channel will be designated as the Digital Control Channel (DCCH) and the remaining 8 channels will be used as the Digital Traffic Channel (DTC). In order to support up to 8 simultaneous conversations, for instance, four ISDN-BRI lines may be used to connect the IBS 130 to the LDS 140 (FIG. 1). Therefore, an IBS with 8 DTCs can support up to 8 simultaneous calls. When a user subscribes to the LCS services as a DN-based user, the subscriber will be given a DN during registration or service activation (that is, each DN is assigned with a TEI designated to an IBS) and the MS is in effect assigned to a specific IBS in the subscribed HNZ for call delivery purposes. For example, subscriber 10 will be assigned to IBS 130-2. Referring again to FIG. 1, since IBS 130 will be connected to an LDS such as the No. 5 ESS or DMS-100 digital switch 140, a DN based network switching element, the call routing between the local switch and the IBS must also be DN-based. The LCS service may use Cellular/DPCS RF infrastructure that is a MSC/MIN based switching platform. Therefore, these two different switching algorithms creates alternative call delivery scenarios for LCS calls. Consider the following LCS call delivery scenarios.

When a MIN-based LCS subscriber enters an LCS coverage area and receives an incoming call, the local digital switch 140 will not deliver a MIN based call (that is, only an MSC does it). The local NSP, for example, NSP 145-1 dynamically assigns a DN that belongs to the IBS 130-2 that MS 10 is currently registered to deliver the call.

When the PSTN delivers a call to a DN-based MS, the local digital switch 140 routes the call to the IBS associated with that DN. If the MS is registered with another IBS (which may be referred to as a Target-IBS or T-IBS which could be located in VNZ/HNZ) at that time, the IBS works with the NSP and the local switch to transfer the incoming call to an NSP dynamically assigned DN supported by that T-IBS.

However, if these dynamically assigned DNs as described from the above scenario are assigned previously to a subscriber as a permanent DN, then the LCS system will not immediately be able to deliver the incoming call for lacking of the DN necessary for the local switch to process the incoming call. Two out of the 8 DNs of each IBS's 4 ISDN/BRI lines will be reserved for this purpose and used only for call processing purposes by the local switch. These dynamically assigned DNs should not be assigned to any subscriber. These dynamically assigned DNs from each IBS will be referred to herein as the call Forward DNs (FDNs). The FDNs will be used for MIN-based call delivery and DN-based roaming capabilities. FDNs are transparent to the end-users; they are used internally by the LCS system. When the local switch delivers a call to a MIN-based or visiting DN-based MS, after the NSP locates the MS, the NSP assigns an FDN from the currently registered IBS to the MS in order for the local switch to terminate the call.

PSTN call delivery of DN-based mobiles can also occur using the Advanced Intelligent Network. All DNs associated with DN-based mobiles have triggers set on the digital switch such that when the digital switch 140 receives the call, the switch requests additional routing instructions from the NSP. The NSP pages the MS to determine its current location, T-IBS. If the MS is registered in its home IBS, the NSP directs the switch to complete the call to the DN. If the MS is registered in another IBS, the NSP assigns an available FDN from T-IBS and directs the switch to forward the call to the T-IBS/FDN.

Numbering Schemes

As already introduced above, there exist three numbering options for LCS services: 1) Use an existing cellular/DPCS MIN, 2) Use a new DN or 3) Use a ported ILEC DN (the subscriber's former wired PSTN service telephone number ported from the local exchange carrier).

Call routing differs slightly between a DN-based MS and a MIN-based MS because the MIN-based MS requires interaction with the HLR while the DN-based MS does not.

Numbering Scheme One: Mobile Identification Number

In this addressing scheme option, the new LCS subscriber is an existing wireless service (WS) customer and desires to keep the same MIN for their new LCS services. These subscribers will be identified in this document as MIN-based LCS subscribers.

Numbering Scheme Two: LCS Service Provider Assigns New LCS Phone Directory Number In this addressing scheme option, the new subscribers may or may not have an existing IS-136 phone. However, a DN will be assigned by local service representatives. The DN may be programmed into the IS-136 phone via IS-136 based Over-the-air Activation Teleservice (OATS), described subsequently herein. These subscribers will be identified in this document as DN-based LCS subscribers.

Numbering Scheme Three: Ported Local ILEC DN

LCS subscribers who give up their conventional wired service can port their existing residential landline phone numbers (i.e., from their local exchange carrier, ILEC) to LCS services. The DN can be programmed into the IS-136 phone via IS-136 based OATS. These subscribers will be identified in this document also as DN-based LCS subscribers.

The Process of Actuating an LCS Subscriber

A new LCS subscriber may purchase MS apparatus at a retail outlet, preferably, an IS-136 compliant mobile station set with a display. The subscriber buys their phone at a retail outlet and the retail outlet records the purchase in a service provider database, ID 146. Manufacturers may or may not provide retail outlets with secure information of the electronic manufacturer's serial number which is secret to the purchaser. A retailer may register a subscriber with a chosen network service provider. The point-of-sale information may include subscriber name, address, credit card number, home directory number (DN), unique electronic serial identification number (MSID), optional personal identification number (PIN) and other verification number. Subscriber data will be referred to herein as a subscriber profile preferably maintained at an NSP ID 146. The new subscriber then may alternatively or in addition dial a telephone number provided for customer service center (LCS CSC) 160 and is connected to a service representative or a voice interactive response unit known in the art to preregister for services. While a subscriber or retailer can dial from a retail outlet, causing the subscriber to call LCS CSC 160 provides an additional validation of subscriber data as a subscriber profile is built. For example, an ANI check can compare a point-of-sale entered DN against a dialed number recovered via ANI and reported at a CSC 160. Either the device or a service representative may welcome the new subscriber's call and thank the new subscriber for subscribing to LCS. Either may then request of the subscriber their personal profile data for verifying or completing their subscriber profile which may be verified by known processes with point-of-sale data. The new subscriber is requested to particularly select an option for addressing: 1) do they wish to disconnect their wired PSTN service and reuse the associated DN, 2) obtain a new LCS number or 3) use their MIN from an existing mobile wireless service. The subscriber is also advised of the rate selection opportunities and boundaries of neighborhood zones they may be interested in.

The LCS CSC 160 then processes and temporarily stores all subscriber information in a subscriber profile of an NSP 145 including such information as selected home neighborhood zone, visiting neighborhood zone(s) they have subscribed to, calling features, the make and model and electronic serial number of the subscriber's MS (MSID), if available, personal identification number (PIN) and billing address and payment information. The electronic manufacturer's serial number may comprise, for example, less than 34 or 45 bits according to known MIN and IMSI systems. The PIN should be of reasonable length, for example, not to exceed ten alphanumeric characters. All the related subscriber service profile data will be populated into the LCS CSC database at registration and communicated, for example, by the IP-based intranet or VPN to populate a database at LCS authentication center (AC) 190. Service profile data is also normally stored here which includes channel frequency tables for, for example, 800 MHz or 1900 MHz services/frequencies available in real time.

Once the new subscriber is validated and their profile completed, the LCS CSC 160 generates a unique data word that the subscriber will use later to actuate service, referred to herein as a feature code. Also, a personal identification number which may be of the new subscriber's choice may be mutually agreed upon and stored. The feature code may preferably comprise in combination a manufacturer's serial number, a PIN and a unique sequence of bits, not to exceed a length permissible within the IS-136 OATS message. The unique bit sequence and PIN in combination will be given to the new subscriber so the subscriber may actuate their LCS service automatically via a self-activating and authenticating process to be referred to herein as over-the-air activation teleservice (OATS). The subscriber profile including PIN is further downloaded, in a preferred embodiment, via the IP-based intranet or VPN to intelligent databases 146 for their HNZ and any VNZ to which they have subscribed. For example, subscriber 10 may be a subscriber to HNZ 105-1, VNZ 115-1 and VNZ 115-2. In such an instance, the subscriber profile will be provided to intelligent databases 146-1 and 146-2.

Henceforth in the detailed description of the invention, call registration, call processing and call hand-off features will be described in FIGS. 3–7 with reference to generic elements, for example, switch 140 or specific elements such as switch 140-1 with no intention to be limited by the use of the specific elements of FIG. 1. The invention is not limited by the specific arrangement of elements of FIG. 1. However, the reader may find the specific references useful in understanding call processing functions from the viewpoint of one example of an LCS subscriber 10.

NAM downloading and a Self-Actuating LCS Service (OATS)

In order for the subscriber to acfuate their LCS service, they should be in their selected HNZ 105. For example, new subscriber 10 must be in the boundaries of their HNZ 105-1. Subscriber 10 then turns on their MS 10 and enters their unique bit sequence and/or PIN. (The PIN may be used in a similar manner to the manner that PIN's are presently used in wireless services generally, namely, to promote call security and prevent service piracy and, consequently, may be optional). The preamble consists of the MS locking onto the IBS 130-2, transmitting an IS-136 Origination message including the feature code/PIN to the IBS 130-2 and IBS 130-2 forwarding the message via RDT 178, GR303 link 185, and local switch 140-2 to its associated intelligent switch controller (NSP) 145-1. The MS 10 generates the feature code FC portion of the message from the stored unique MSID, the unique bit sequence given the subscriber (which they enter by using their phone keypad) and their PIN (also using the keypad). The order of bits in the FC should be predetermined so that the FC can be decoded at the NSP. Since the ID 146-1, after the subscriber registration process is completed, should have the subscriber profile stored for that subscriber including their feature code, unique bit sequence and/or PIN, the NSP 145-1 validates the MS by comparing the entered feature code including PIN with data stored in the ID 146-1. A further validation may include the comparison of a collected electronic serial number of the MS with an associated database entry if obtainable from the manufacturer or the retail outlet that sold the phone. If there is no match of all or any of the two (or three), a message may be returned to suggest the subscriber contact LCS CSC 160. After the NSP 145-1 verifies that the subscriber profile is in the ID 146-1, it initiates OATS to activate the MS by sending the Configuration Data Request message to the MS via IBS 130-2. The MS responds with Configuration Data Response to the NSP 145-1 via IBS 130-2. Altogether the preamble and the configuration data request and response comprise process step "a" shown in FIG. 3.

Figure 3:
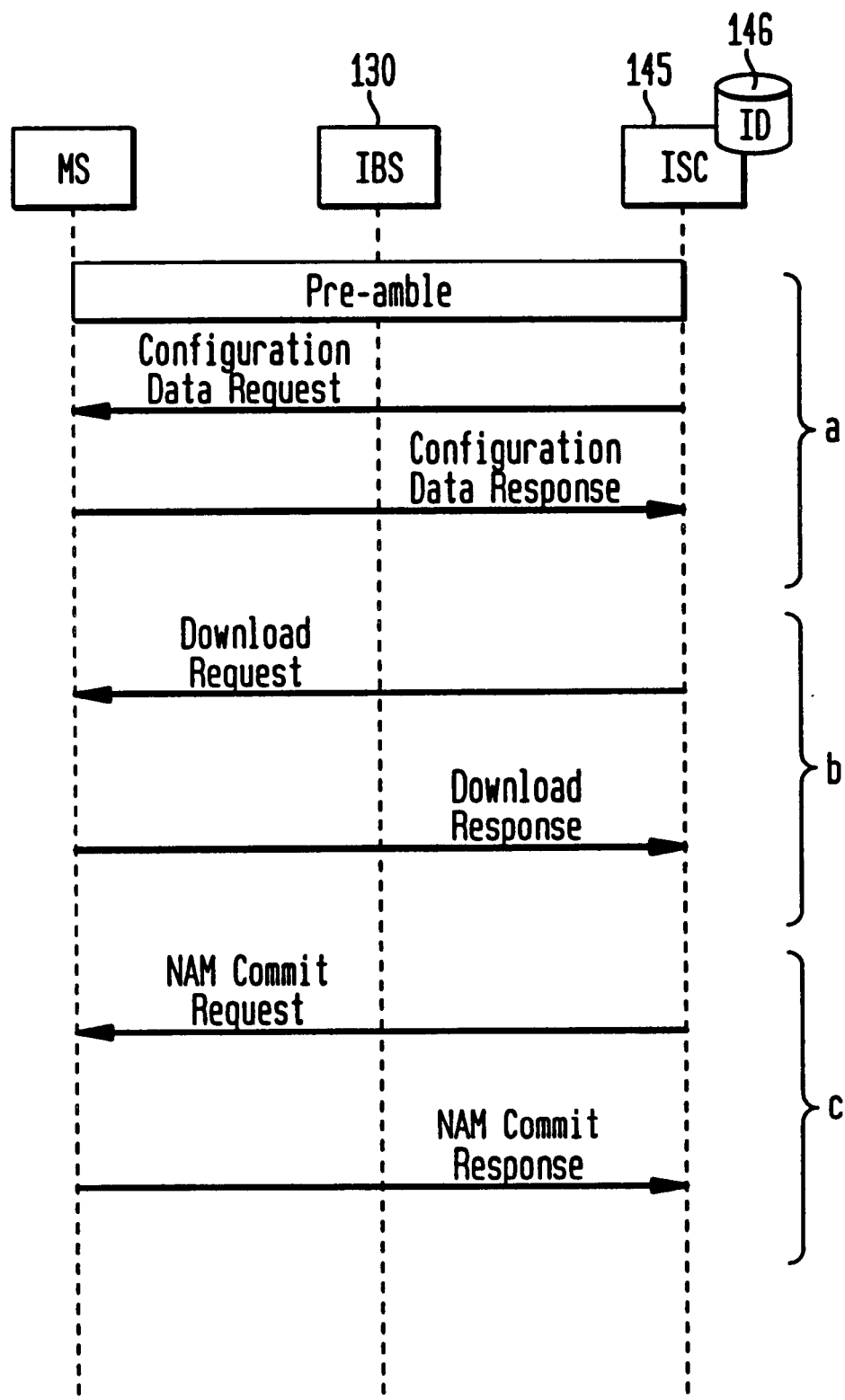
FIG. 3 shows the message flow process between a mobile station (MS) and a network server platform (NSP) and associated database (ID) for downloading a number assignment module (NAM).

As shown in FIG. 3 step "b", once a download request message is received by MS, a download response requesting a download is transmitted to NSP 145-1. This message includes a request for the downloading of all algorithms and data necessary for LCS service including a number assignment module (NAM) giving the MS its subscriber opted-for address (MIN or DN). After the NSP receives the download response message, step "c" begins and a NAM commit request message is transmitted to the MS. This message instructs the MS to program/populate and commit a designated number assignment module area of memory (NAM (x)) with the downloaded data. If a subscriber decides to use their directory number as the number to be called, NAM(x) will be designated for LCS DN programming, and likewise if the subscriber decides to use their MIN as their reach number, NAM(x) will be designated for LCS MIN programming. Now the registration processes will be discussed for each of the options of MIN or DN based LCS service and when either must register in a visiting neighborhood zone to which the subscriber has subscribed. These processes are carried out in real-time.

Registration Process for a MIN-Based MS

Referring to FIG. 4a, there are shown steps "a", "b", "c" and associated with registration processes for a MIN-based subscriber in their home neighborhood zone. In step "a", the DCCH process consists of IBS 130 broadcasting system-wide and IBS 130 specific parameters (such as system and IBS 130 identification) on its DCCH and the MS 10 locking onto the DCCH when the MS 10 powers up. The MS 10 sends an IS-136 registration message to the IBS 130. IBS 130 forwards the registration message to its associated NSP 145 via the LDS local switch 140. This message contains IS-136 registration data. In step "b" the home zone NSP 145 checks the MS's status with its Intelligent Database (ID) 146 and determines that the MS is a valid MIN-based LCS service subscriber. Since the MS is MIN-based, NSP must interact with the WS HLR for the registration process. If the optional MS authentication is required (this is determined by the LCS service provider and indicated to the MS 10 as one of the DCCH broadcast parameters), the MS IS-136 Registration message will include the authentication information. The NSP 145 will initiate the authentication procedure with LCS AC 190 by sending an authentication message via router 165. The NSP 145 sends an IP-based message containing IS-41-like authentication information to the LCS AC. After successful authentication of the MS, the LCS AC sends an IP-based IS-41-like auth message back to the NSP 145.

In step c, after successful MS authentication, or if no authentication is required, NSP 145 must register the MS 10 by sending a registration message to the WS HLR 175-2 via gateway 170 to update the MS's new location for call delivery purposes. The NSP 145 sends a TCP/IP-based message containing IS-41-like registration information to the TCP/IP to SS7 Gateway (GW) 170. The GW 170 receives the registration message which also includes the NSP's unique IP address, translates the message into an SS7/TCAP/IS-41 REGNOT message and sends it to the HLR 175-2.

After a successful registration, the HLR 175-2 sends an SS7/TCAP/IS-41 regnot message back to the GW 170. The GW receives the IS-41 regnot message, translates the message into a TCP/IP based registration accept message. Since the GW 170 stores each NSP 145 unique IP address based on information gathered during MS registration message, the GW sends the registration accept req accept message back to NSP 145 based on the NSP's unique IP address. The NSP 145 processes the registration accept req accept message and sends it to the IBS 130. NSP 145 notes that the mobile is successfully registered and active.

In step d, the IBS 130 sends an IS-136 Reg. Accept message to the MS 10 to complete the MS registration procedures.

There are two possibilities when a MIN-based MS 10 registers in a VNZ 115. The first one is where the VNZ and the HNZ are covered by the same NSP (cell 101-2 in FIG. 1 comprising HNZ 105-1 and VNZ 115-1). The second is where the VNZ and the HNZ are covered by different NSPs (HNZ 105-1 and VNZ 115-2). As far as the LCS system is concerned, both MIN-based registration signaling flows are the same as discussed in the previous section (MIN-based MS registered in the HNZ). The HLR 175-2 is updated when the latest registration location occurs regardless of whether the MS 10 is in the HNZ or the VNZ.

Registration Process for a DN-Based MS

Figure 4B:
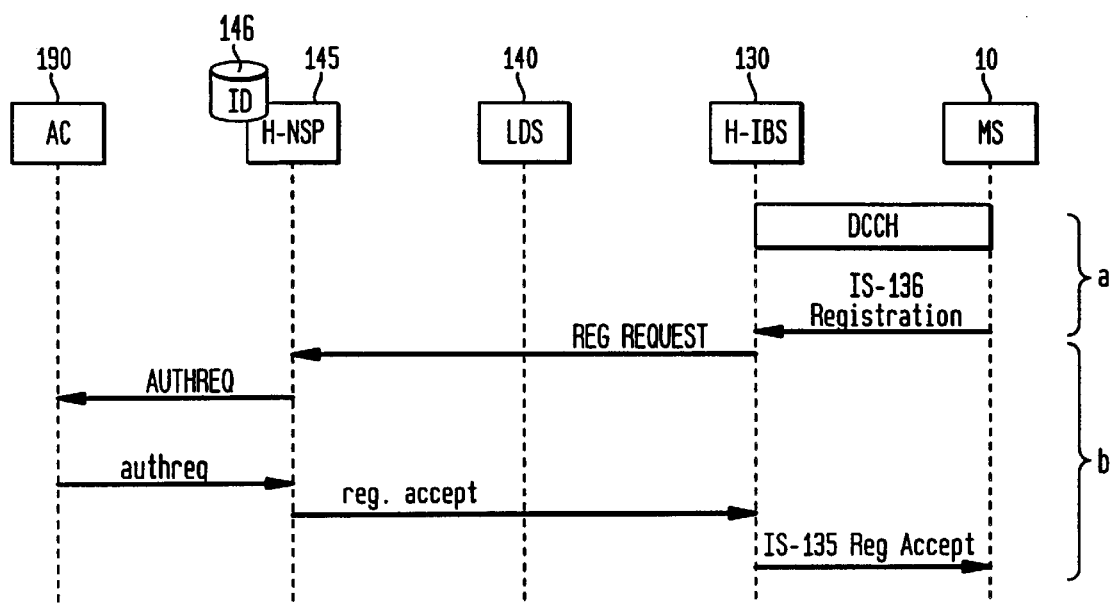
FIG. 4b shows an exemplary call processing flow for registration of a mobile station with a directory number (DN) in its associated home neighborhood zone (HNZ).

Referring to FIG. 4b, there is depicted the signaling flow scenario of an MS that uses an assigned directory number (DN) or a ported ILEC DN as the number to be used in the subscribed-to neighborhood LCS zones. Since the MS is DN-based, there is no requirement for interaction with an HLR 175-2 during registration. During service activation, the subscriber's profile is downloaded to every NSP/ID that covers the subscribed-to zones, the HNZ and any subscribed-to VNZs. The subscriber has already activated the LCS service via OATS.

The signaling flow shown in FIG. 4b describes the scenario where a DN-based MS 10 registers that requires just two steps "a" and "b". In step "a" the DCCH process consists of H-IBS 130 broadcasting system-wide and H-IBS 130 specific parameters (such as system and H-IBS 130 identification) on its DCCH and the MS locking onto the DCCH when the MS powers up. The MS sends an IS-136 registration message to the home zone H-IBS 130. The H-IBS 130 forwards the registration message to the H-NSP 145 via the LDS 140. This message contains IS-136 registration data.

In step "b" the H-NSP 145 checks the MS's status with the Intelligent Database (ID) 146 which already has the subscriber profile, determines that the MS 10 is a valid DN-based LCS subscriber. If the optional authentication procedure is required (as determined by the LCS service provider), the H-NSP 145 sends an IS-41-like AUTHREQ message in IP format to the LCS Authentication Center (AC) 190 in order to authenticate the mobile. When the authentication process is successful, the AC 190 returns an authentication request response message auth req to the H-NSP 145. The H-NSP 145 sends the reg. accept message to the H-IBS 130. The H-IBS 130 sends an IS-136 Reg. Accept message to the MS to complete the MS registration procedures.

When a LCS subscriber roams or otherwise moves to a subscribed-to visiting zone, as far as the subscriber is concerned, the same DN number will be used for all call delivery (i.e., roaming-like situation). A dynamically assignable FDN, described previously, is used to terminate the call.

Figure 4C:
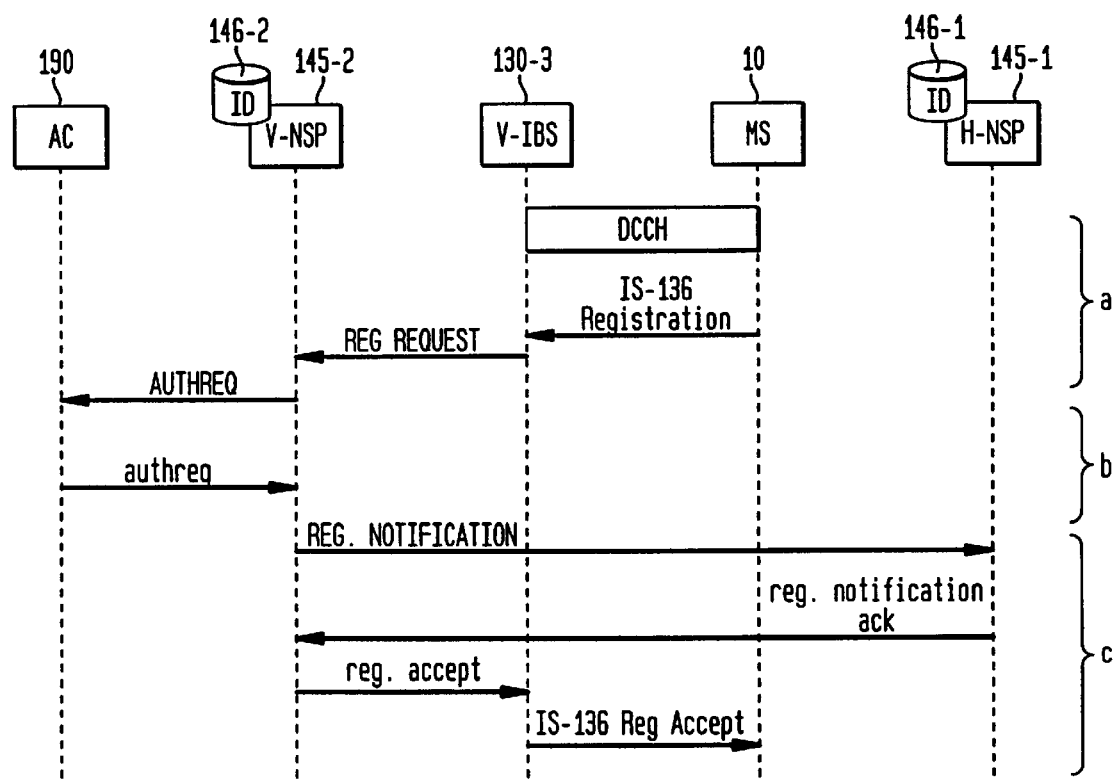
FIG. 4c shows an exemplary call processing flow for registration of a DN-based mobile station in a subscribed-to visiting neighborhood zone (VNZ).

Referring to FIG. 4c, three steps are required to process a registration of a DN-based MS 10 in a VNZ. In step "a," the DCCH process consists of V-IBS 130-3 broadcasting system-wide and V-IBS 130-3 specific parameters (such as system and V-IBS 130 identification) on its DCCH and the MS locking onto the DCCH when the DN-based MS powers up. The MS 10 sends an IS-136 registration message to the visited V-IBS 130. V-IBS 130, for example, V-IBS 130-3, forwards the REG. REQUEST message to the V-NSP 145-2 via the LCS local switch 140-1. This message contains IS-136 registration data.

In step "b" the V-NSP 145-2 checks the MS's status with the Intelligent Database ID 146-2 which has the subscriber profile previously downloaded by the LCS CSC 160 and determines that the MS is a valid DN-based LCS subscriber. The V-NSP 145-2 sends an IS-41-like authreq message in IP format to the AC 190 for subscriber authentication. The AC 190 validates the subscriber with its internal database and returns an authreq response message back to the V-NSP 145-2.

In step "c," the V-NSP 145-2 sends a registration notification message to H-NSP 145-1 to indicate the new location of the MS for proper delivery of incoming calls to the MS. The H-NSP 145.1 records the current MS location as being in a subscribed-to visiting zone 115-2. The H-NSP 145-1 sends a reg. notification response message to the V-NSP 145-2. In return, the V-NSP 145-2 sends registration accept message to the V-IBS 130-3. V-IBS 130-3 sends an IS-136 Reg. Accept message to the visiting MS to complete the registration process.

Call Delivery to an LCS Subscriber

Call processing of a call to or from a subscriber visiting a neighborhood zone involves the utilization of one, two or more reserved forwarding directory numbers (FDN's) in the visited zone. For example, the subscriber MS 10 that visits VNZ 115-2 will be dynamically assigned one of these reserved FDN's while they are in the visited zone. These same FDN's may be used by another subscriber when that subscriber visits the zone from their home zone after the first subscriber no longer needs it.

The call delivery process from an originating switch in the PSTN 100 to a MIN-based LCS subscriber are shown in FIG. 5a. To the extent possible, similar reference characters are borrowed from FIG. 1 to represent similar elements for an incoming call to subscriber MS 10. Process step "a" takes the incoming call request to the home zone NSP 145-1. The LDS] 140-3 of PSTN 100 processes the MIN-based incoming call and sends an ISUP Initial Address Message (IAM) to a PSTN-based MSC 180. The MSC 180 provides services and coordination between mobile users in the public cellular network and between the mobile users and the external network such as PSTN 100. When a PSTN user dials a MIN, the PSTN local switch LDS will always route the call to the MCS switch for call delivery. One way to look at the phone networks including PSTN 100, public cellular network and LCS is that all the switches from each network are fully connected and they all have connections to the Common Signaling Network Number 7 (SS7). The Mobile Switching Center, MSC 180, provides switching functions for the cellular network and coordinates the establishments of calls to and from cellular/DPCS subscriber. The MSC interfaces with the cellular network(s) and the public switch networks. Since the MSC does not have the MIN-based user currently registered, the MSC sends a SS7/TCAP/IS-41 location request (LOCREQ) message to HLR 175-2. The HLR 175-2 knows the current registration location of the MIN-based MS because of prior registration notification from the home zone NSP (H-NSP) 145-1 via the gateway (GW) 170. HLR 175-2 sends a SS7/TCAP/IS-41 route request (ROUTREQ) message to the H-NSP 145-1 via the GW 170 for routing instructions to the MS 10. The GW 170 translates the message to an IP message and sends it to the H-NSP 145-1 (ROUTE REQ (MIN)). This completes process step "a".

Process step "b" involves letting the MSC 180 know the result. The H-NSP 145-1 verifies that the MS 10 is still registered in the home zone and is presently idle. H-NSP 145-1 reserves an available forward directory number (FDN) and a B-channel for its transmission in the home zone IBS (H-IBS) 130-2. Then, H-NSP 145-1 returns a route request response message including the reserved FDN to the GW 170. If no FDN is available, of course, the H-NSP 145-1 rejects the request. Continuing a favorable call-completion scenario, the GW 170 translates the IP message to a SS7/TCAP/IS-41 routreq response message and sends it to the HLR 175-2. This completes process "b".

Process step "c" takes the call from HLR 175-2 to a set-up request of H-IBS 130-2. The HLR returns the reserved FDN information in the IS-41 TCAP locreq response message to the MSC. The MSC 180 initiates call setup by sending an ISUP IAM message to the LDS 140-2 based on the FDN. The LDS 140-2 sends a Q.931 call setup message to the H-IBS 130-2 based on the reserved DN. This concludes process "c".

Process step "d" relates to acknowledgment. The H-IBS 130-2 sends a call request message to the H-NSP 145-2 to validate the call request. Note: H-NSP 145-1 may initiate IS-136 authentication procedure when necessary. The H-NSP 145-1 uses the ID database 146-1 to locate the record of FDN-to-MIN mapping to validate the call. If the request is valid and RF resources are available, H-NSP 145-1 will reserve a digital traffic channel (DTC) for call delivery. H-NSP 145-1 then sends a call request ack message with the MIN, DTC, and B-channel (reserved when the FDN was assigned to the call) to the H-IBS 130-2. If the call request is not valid or no resources are available, the H-NSP 145-1 will return a call request nack (stands for negative acknowledgment) and the H-IBS 130-2 will release the call. This concludes process "d".

In process step "e", the H-IBS 130-2 starts to page the MIN-based MS 10. H-NSPH-IBS (Note: The IS-136 MS paging process is as follows: the H-IBS 130-2 broadcasts an IS-136 page for the MIN-based MS 10. The MS 10 must respond with an IS-136 page response message within a specified time period. If the MS 10 does not respond, the H-IBS 130-2 will release the call.) After the MS 10 successfully responds to the page, the H-IBS 130-2 sends a Q.931 call proceeding message to the LDS 140-2.

In process step "f", the H-IBS 130-2 sends a DTC designation message to the MS 10 and verifies the MS is on the DTC by monitoring the returning DVCC code status change. After the MS 10 locks onto the DTC (DVCC status change), the H-IBS 130-2 sends an IS-136 alert with info message to the MS 10 to initiate a ringing indication to the user. H-IBS 130-2 also sends a Q.931 alert message to the LDS 140-2. The LDS 140-2 sends an ISUP address complete message (ACM) to the MSC to complete the end-to-end call connection. The MSC 180 sends an ISUP ACM message to the PSTN 100.

Process step "g" is similar to a cellular/DPCS connect process. The LDS 140-2 generates alerting (ring back tone) to the originating user. When the MIN-based user 10 picks up the call and the MS 10 sends an IS-136 connect message to the H-IBS 130-2, the H-IBS 130-2 sends a Q.931 connect message to the LDS 140-2. The LCS switch 140-2 sends an ISUP address answer message (ANM) to the MSC. The MSC 180 sends an ISUP ANM message to the PSTN switch 100, the PSTN switch connects the caller and thus the voice path is established and completes the call delivery process.

Call Delivery to a DN-based Subscriber, the DN Being Assigned for LCS

Figure 5B:
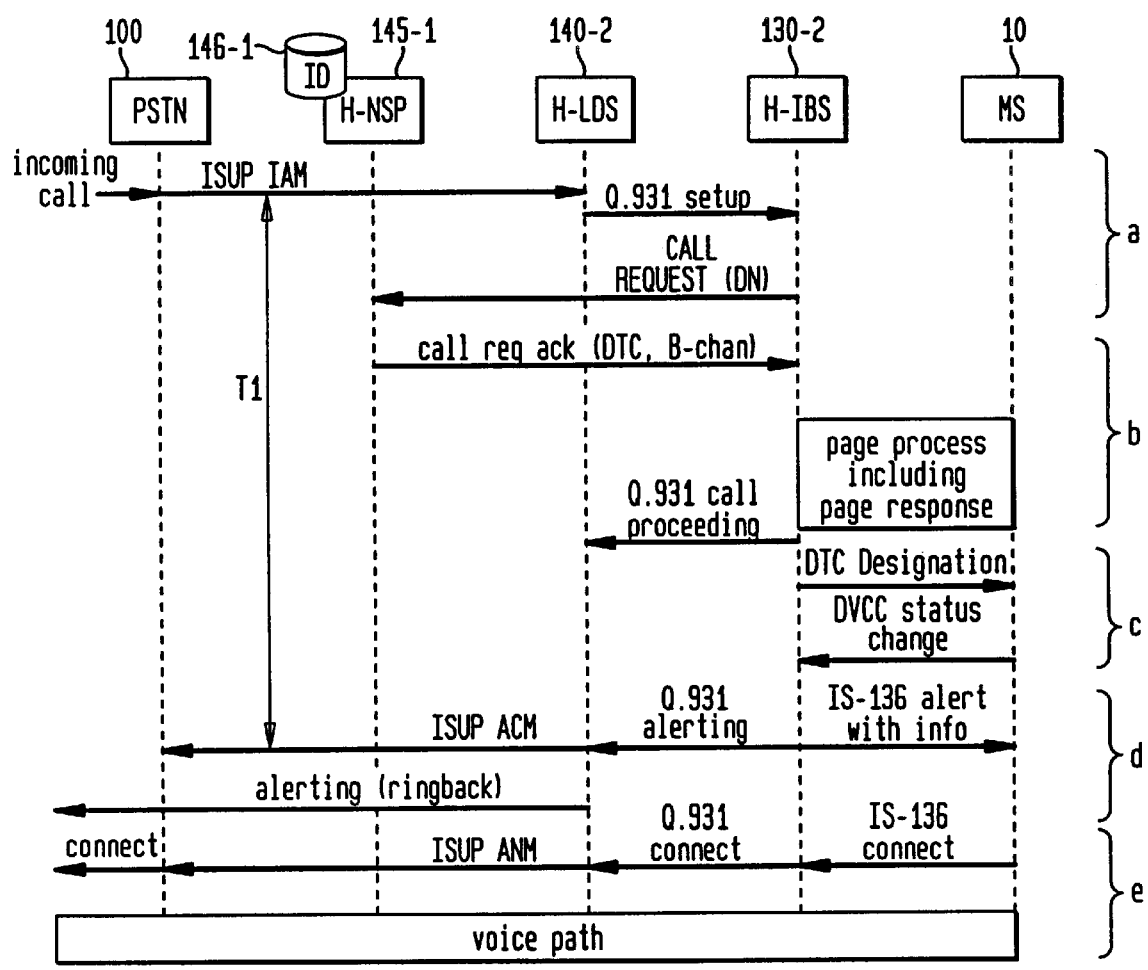
FIG. 5b shows an exemplary call delivery to a DN-based subscriber in the HNZ via the home IBS.

FIG. 5b describes the signaling flow scenario of a PSTN caller dialing the LCS subscriber's DN when the DN is registered with the H-IBS in the HNZ. In step "a" an originating PSTN switch (somewhere in PSTN 100) processes the DN-based incoming call and sends an ISUP IAM message to the HNZ LDS (H-LDS) 140-2 based on the DN dialed. The H-LDS 140-2 sends a Q.931 call setup message to the H-IBS 130-2 based on the DN dialed. The H-IBS 130-2 sends a CALL REQUEST message to the H-NSP 145-1 to validate the call request. The H-NSP 145-1 may initiate an authentication procedure with an AC 190 when and if necessary.

In step "b," the H-NSP 145-1 validates the call by searching the ID 146-1 and discovers that the MS 10 is registered in its home IBS, H-IBS 130-2. If the request is valid and resources are available, H-NSP 145-1 will reserve a DTC and a B-channel. H-NSP 145-1 then sends a call request ack message with the resource information to the H-IBS 130-2. H-IBS 130-2 starts to page the DN-based MS. If the call request is not valid or no resources are available, the H-NSP 145-1 will return a call request nack and the H-IBS 130-2 will reject the call.

The IS-136 MS paging process is as follows: the H-IBS 130-2 broadcasts an IS-136 page for the DN-based MS. The MS 10 must respond with an IS-136 page response within a specified time period. If the MS 10 does not respond, the H-IBS 130-2 will release the call.

After successfully paging the MS, the H-IBS 130-2 then sends a Q.931 call proceeding message to the H-LDSH-LDS 140-2. This connects the B-channel to the H-LDS 140-2.

In step "c," the H-IBS 130-2 sends a DTC designation message to the MS and verifies the MS is on the DTC by monitoring the returning DVCC code status change.

In step "d," after the MS locks onto the DTC (DVCC status change), the H-IBS 130-2 sends an IS-136 alert with info message to the MS to initiate ringing indication to the user. It also sends a Q.931 alert message to the LCS switch, H-LDS 140-2. The H-LDS 140-2 sends an ISUP address complete message (ACM) to the PSTN switch to complete the end-to-end connection. The H-LDS 140-2 generates alerting (ringback tone) to the originating user.

In step "e," when the DN-based MS user picks up the call, the MS sends an IS-136 connect message to the H-IBS 130-2. The H-IBS 130-2 sends a Q.931 connect message to the H-LDS 140-2. The H-LDS 140-2 sends an ISUP address answer message (ANM) to the PSTN switch, the PSTN switch connects the caller and thus the voice path is established, completing the incoming call delivery process.

Figure 5C:
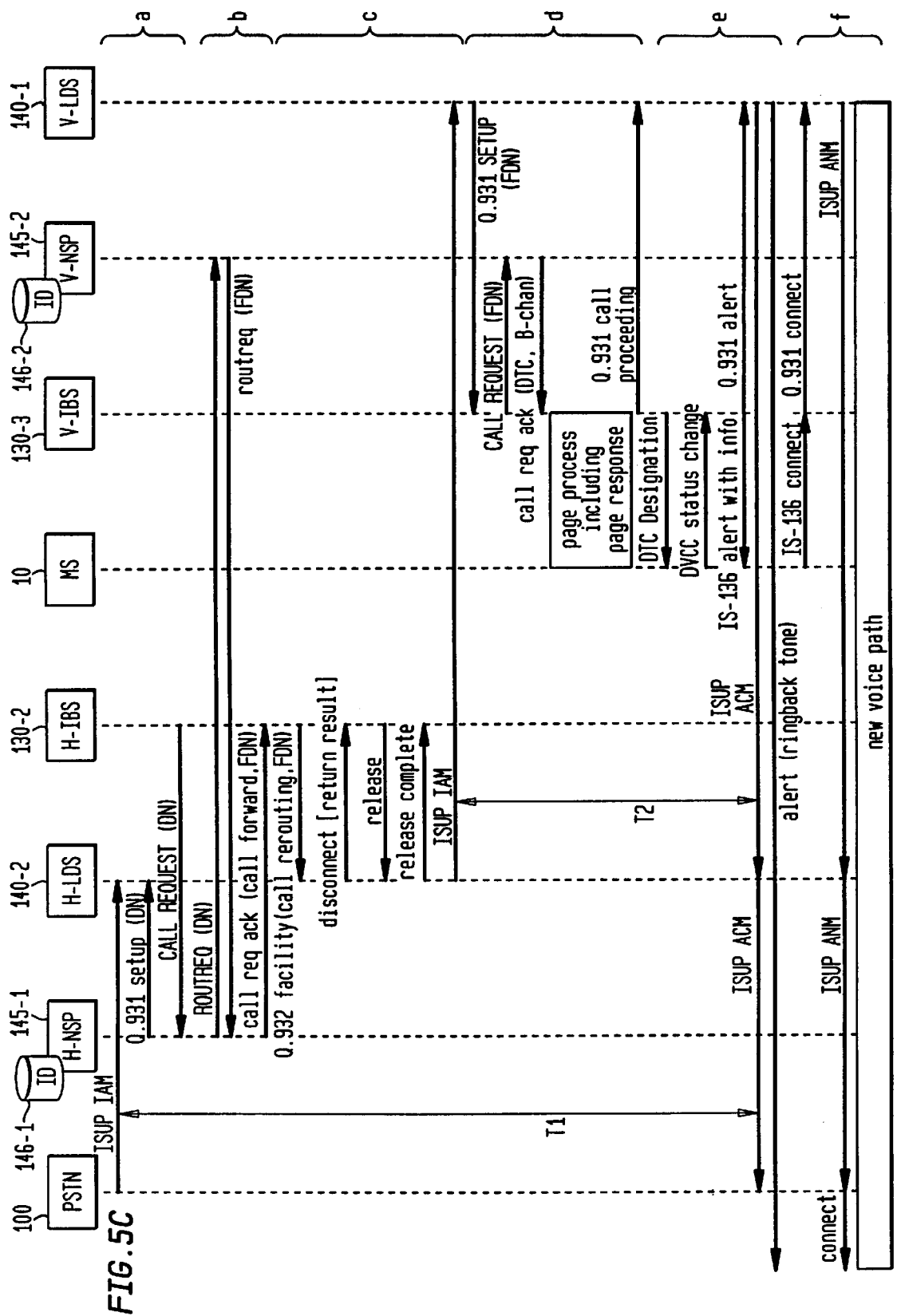
FIG. 5c shows an exemplary call delivery to a visiting neighborhood zone for a DN-based subscriber registered with the visited V-NSP.

The called MS's DN may be registered with a visited V-NSP, for example, V-NSP 145-2 in the VNZ 115-2. Referring to FIG. 5c, step "a" the originating PSTN switch processes the DN-based incoming call by sending an ISUP Initial Address Message (IAM) to the H-LDS 140-2 based on the DN dialed. The H-NSP 145-1 sends a Q.931 call setup message to the H-LDS 140-2 based on the DN dialed. The H-IBS 130-2 sends a CALL REQUEST message to the H-NSP 145-1 to validate the call request. The H-NSP 145-1 may initiate authentication procedure when necessary with AC 190.

In step "b," the H-NSP 145-1 validates the call by searching the ID 146-1 and discovers that the MS is currently registered in a subscribed-to VNZ (V-NSP) 115-2. Consequently, H-NSP 145-1 sends an IS-41-like ROUTREQ message in IP format to the V-NSP 145-2 for routing instructions to the DN-based MS. The V-NSP 145-2 confirms via ID 1462 that the MS is still registered and idle in V-IBS 130-3. It reserves an available FDN from V-IBS 130-3, and returns a route request response message including FDN to the H-NSP 145-1. The V-NSP 145-2 also reserves a B-channel for the FDN. If no FDNs are available, V-NSP 145-2 rejects the call which ultimately results in rejecting the call to the originating user. The H-NSP 145-1 sends call req ack to the H-IBS 130-2 with an indication to forward the call to the FDN from V-NSP 145-2.

In step "c," the H-IBS 130-2 sends a Q.932 facility message to the H-LDS 140-2 to reroute the call to the forward FDN. The H-LDS 140-2 sends the facility return result in a disconnect message for response to the facility invoke message to the H-IBS 130-2; on receipt of the disconnect message, the H-IBS 130-2 sends a release message to the H-LDS 140-2, and the H-LDS 140-2 sends a release complete message in return. Immediately after sending the disconnect message, the H-LDS 140-2 sends an ISUP IAM message to the V-LDS 140-1 based on the FDN.

In step "d," the V-LDS 140-1 now has the call. The V-LDS 140-1 sends a Q.931 call setup message to the V-IBS 130-3 based on the FDN. The V-IBS 130-3 sends a call request message to the V-NSP 145-2 to validate the call request. The V-NSP 145-2 may initiate authentication procedures with AC 190 when necessary. The V-NSP 145-2 uses the ID 146-2 database to locate the record of FDN-to-DN mapping to validate the call. If the request is valid, and RF resources are available, the V-NSP 145-2 reserves the RF resource, the DTC, for call delivery. The V-NSP 145-2 then sends a call request ack message with the DTC and B-channel (reserved when the FDN was assigned to the call) to the V-IBS 130-3. The V-IBS 130-3 starts to page the DN-based MS (the paging process is described above in respect to FIG. 5b, step "b"). If the call request was not valid or if no resources are available, the V-NSP 145-2 will return a call req nack and the V-IBS 130-3 will release the call. The V-IBS 130-3 sends a Q.931 call proceeding message to the V-LDS 140-1 after successfully paging the MS. This connects the B-channel to the V-LDS 140-1.

In step "e," the V-IBS 130-3 sends a DTC designation message to the MS and verifies the MS is on the DTC by monitoring the returning DVCC code status change. After the MS locks onto the DTC (DVCC code status change), the V-IBS 130-3 sends an IS-136 alert with info message to the MS to indicate ringing to the user. The V-IBS 130-3 also sends a Q.931 alert message to the V-LDS 140-1. The V-LDS 140-1 sends an ISUP address complete message (ACM) to the H-LDS 140-2 and the H-LDS 140-2 sends an ISUP ACM message to the PSTN 100 to complete the end-to-end connection. The V-LDS 140-1 generates alerting (ringback tone) to the originating user.

In step "f," when the DN-based visiting subscriber picks up the call, the MS sends an IS-136 connect message to the V-IBS 130-3. The V-IBS 130-3 sends a Q.931 connect message to the V-LDS 140-1. The V-LDS 140-1 sends an ISUP address answer message (ANM) to the H-LDS 140-2 and the H-LDS 140-2 sends an ISUP ANM message to the PSTN switch. The PSTN switch connects the caller and thus the new VNZ voice path is established.

Call Delivery to a DN-based Subscriber, the DN being a Ported Number from ILEC

FIG. 5d describes the signaling flow scenario of a PSTN caller dialing the DN-based LCS subscriber when the called MS's DN is a ported number from ILEC. As already described, LCS subscribers may carry their existing residential landline phone numbers to the subscribed HNZ for LCS services. The MS is registered with the H-IBS 130-2 in the HNZ 105-1. In step "a," the originating PSTN switch receives a call with a ported DN; so the PSTN switch sends a TCAP LRN REQUEST message to the STP for a 6-digit LRN Global Title Translation (GTT) for call routing information. The STP performs GTT on the DN to determine the point code of the appropriate SCP database and sends a TCAP LRN routing instruction request to the SCP. The SCP's LRN application does 10-digit translation to determine the LRN of the terminating office and sends an LRN reply message to the originating PSTN switch based on the originating point code in the incoming message. The STP forwards the LRN reply to the PSTN switch without changing any protocol elements.

In step "b" the originating PSTN switch receives the LRN reply message, processes the message and uses the information for call routing. The PSTN switch sends an ISUP IAM message to the HNZ LDS (H-LDS) 140-2 based on the LRN reply. The H-LDS 140-2 sends a Q.931 call setup message to the H-IBS 130-2 based on DN.

In step "c," the H-IBS 130-2 sends a CALL REQUEST message to the H-NSP 145-1 to validate the call request. The H-NSP 145-1 may initiate an authentication procedure with AC 190 when necessary. The H-NSP 145-1 validates the call request by searching the ID 146-1 and discovers that the MS is currently registered in its H-IBS 130-2. If the request is valid and resources are available, H-NSP 145-1 will reserve the DTC and the B-channel. H-NSP 145-1 then sends a call request ack message with the resource information to the H-IBS 130-2. H-IBS 130-2 starts to page the DN-based MS. If the call request is not valid or no resources are available, the H-NSP 145-1 will return a call request nack and the H-IBS 130-2 will reject the call. The IS-136 MS paging process has already been described above.

In step "d," the H-IBS 130-2 sends a Q.931 call proceeding message to the H-LDS 140-2 after successfully paging the MS. This connects the B-channel to the H-LDS 140-2. The H-IBS 130-2 sends a DTC designation message to the MS and verifies the MS is on the DTC by monitoring the returning DVCC code status change. After the MS locks onto the DTC (DVCC status change), the H-IBS 130-2 sends an IS-136 alert with info message to the MS to indicate ringing to the user. H-IBS 130-2 also sends a Q.931 alert message to the H-LDS 140-2. The H-LDS 140-2 sends an ISUP address complete message (ACM) to the originating PSTN switch to complete the end-to-end connection.

In step "e," the H-LDS 140-2 generates the alerting (ring back tone) to the originating user. When the DN-based MS user picks up the call, the MS sends a IS-136 connect message to the H-IBS 130-2. The H-IBS 130-2 sends a Q.931 connect message to the H-LDS 140-2. The H-LDS 140-2 sends an ISUP address answer message (ANM) to the PSTN switch, the PSTN switch connects the caller and thus the voice path is established, completing the call delivery process.

Figure 5E:
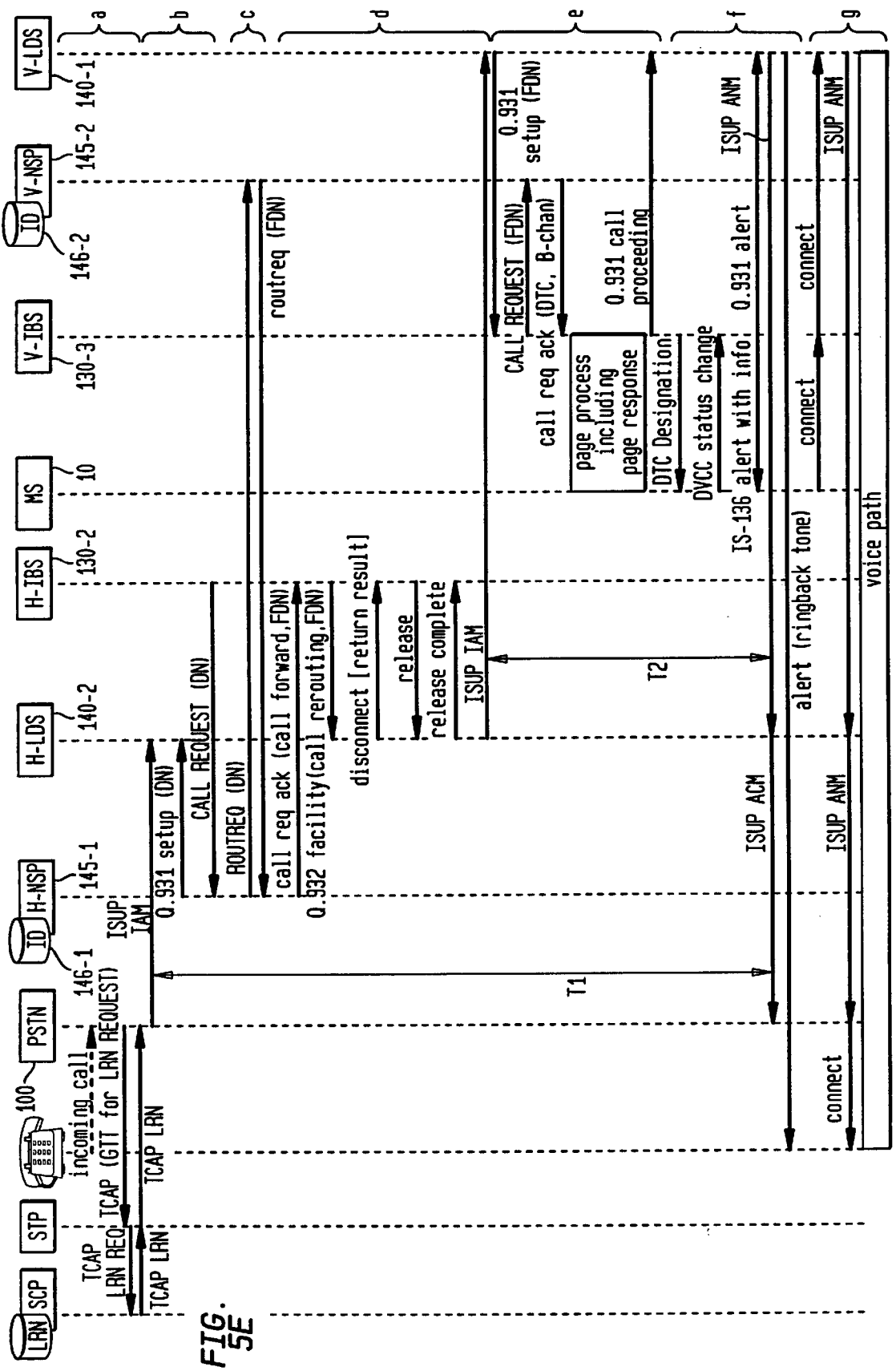
FIG. 5e shows an exemplary call processing for a ported DN based subscriber in a visited zone.

The MS with a DN carried from a local exchange carrier (LEC) may be registered in the VNZ, for example, VNZ 115-2. Referring to FIG. 5e, step "a," the originating PSTN switch receives a call with a ported DN and the PSTN switch sends a TCAP LRN REQUEST message to the STP for a 6-digit LRN Global Title Translation (GTT) for call routing information. The STP performs GTT on the DN to determine the point code of the appropriate SCP database and sends a TCAP LRN routing instruction request to the SCP. The SCP's LRN application does a 10-digit translation to determine the LRN of the terminating office, sends a LRN reply message to the PSTN switch based on the originating point code in the incoming message. The STP forwards the LRN reply to PSTN switch without changing any protocol elements.

In step "b" the originating PSTN switch receives the LRN reply message, processes the message and uses the information for call routing. The PSTN switch sends an ISUP IAM message to the HNZ LDS (H-LDS) 140-2 based on LRN reply. The H-LDS 140-2 sends a Q.931 setup message to the H-IBS 130-2 based on the DN. The H-IBS 130-2 sends a CALL REQUEST message to the H-NSP 145-1 to validate the call.

In step "c," the H-NSP 145-1 validates the call by searching the ID 146-1, and discovers that the MS is registered in a subscribed VNZ (V-NSP) 115-2. It sends an IS-41-like ROUTREQ message in IP format to the V-NSP 145-2 for routing instructions to the DN-based MS. The V-NSP 145-2 verifies via the ID 146-2 that the MS is still registered and is idle in V-IBS 130-3. It reserves an available FDN from V-IBS 130-3, and returns a route request response message including FDN to the H-NSP 145-1. The V-NSP 145-2 also reserves a B-channel for the FDN. If no FDNs are available, the V-NSP 145-2 rejects the call which ultimately results in rejecting the call to the originating user.

In step "d," the H-NSP 145-1 sends a call req ack message to the H-IBS 130-2 with an indication to forward the call to the FDN from the V-NSP 145-2. The H-IBS 130-2 sends a Q.932 facility message to the H-LDS 140-2 to reroute the call to the DN-based MS using FDN. The H-LDS 140-2 sends the facility return result in a disconnect message for response to the facility invoke message to the H-IBS 130-2; on receipt of the disconnect message, the H-IBS 130-2 sends a release message to the H-LDS 140-2, and H-LDS 140-2 sends a release complete message in return. Immediately after sending the disconnect message, the H-LDS 140-2 sends an ISUP LAM message to the V-LDS 140-1 based on the FDN.

In step "e" the V-LDS 140-1 now has the call. V-LDS 140-1 sends a Q.931 setup message to the V-IBS 130-3 based on the FDN. The V-IBS 130-3 sends a call request message to the V-NSP 145-2 to validate the call. As before, the V-NSP 145-2 may initiate authentication procedures via an authentication center when and if necessary. The V-NSP 145-2 uses the ID database 146-2 to locate the record of FDN-to-DN mapping to validate the call. If the request is valid and resources are available, V-NSP 145-2 will reserve the DTC and the B-channel (reserved when the FDN was assigned to the call). V-NSP 145-2 then sends a call request ack message with the resource information to the V-IBS 130-3. V-IBS 130-3 starts to page the DN-based MS. If the call request is not valid or no resources are available, the V-NSP 145-2 will return a call request nack and the V-IBS 130-3 will reject the call. Briefly, the IS-136 MS paging process is as follows: the V-IBS 130-3 broadcasts an IS-136 page for the DN-based MS. The MS must respond with an IS-136 page response within a specified time period. If the MS does not respond, the V-IBS 130-3 will release the call. The V-IBS 130-3 sends a Q.931 call proceeding message to the V-LDS 140-1 after successfully paging the MS. This connects the B-channel to the V-LDS 140-1.

In step "f" the V-IBS 130-3 sends a DTC designation message to the MS and verifies the MS is on the DTC by monitoring the returning DVCC code status change. After the MS locks onto the DTC (DVCC status change), the V-IBS 130-3 sends an IS-136 alert with info message to the MS to indicate ringing to the user. It also sends a Q.931 alert message to the V-LDS 140-1. The V-LDS 140-1 sends an ISUP address complete message (ACM) to the H-LDS 140-2, and the H-LDS 140-2 sends an ISUP ACM message to the PSTN 100 originating switch to complete the end-to-end connection. The V-LDS 140-1 generates the alerting (ring back tone) to the originating user.

In step "g," when the DN-based visiting subscriber picks up the call, the MS sends an IS-136 connect message to the V-EBS 130-3. The V-IBS 130-3 sends a Q.931 connect message to the V-LDS 140-1. The V-LDS 140-1 sends an ISUP address answer message (ANM) to the H-LDS 140-2. The H-LDS 140-2 sends an ISUP ANM message to the PSTN switch. The PSTN switch connects the caller and thus the new voice path is established.

Advanced Intelligent Network triggers may also be used for call delivery for DN based MS. The LCS subscriber's DN is provisioned for the AIN Termination Attempt Trigger (TAT) in the serving LDS. When a call is delivered to the LDS for the subscriber's DN, the TAT is encountered and the LDS sends a call treatment query message to the NSP. The NSP locates the mobile in their serving IBS and reserves an FDN in this IBS. NSP then directs the LDS 140 to deliver the call to the MS based on the FDN.

Figure 5F:
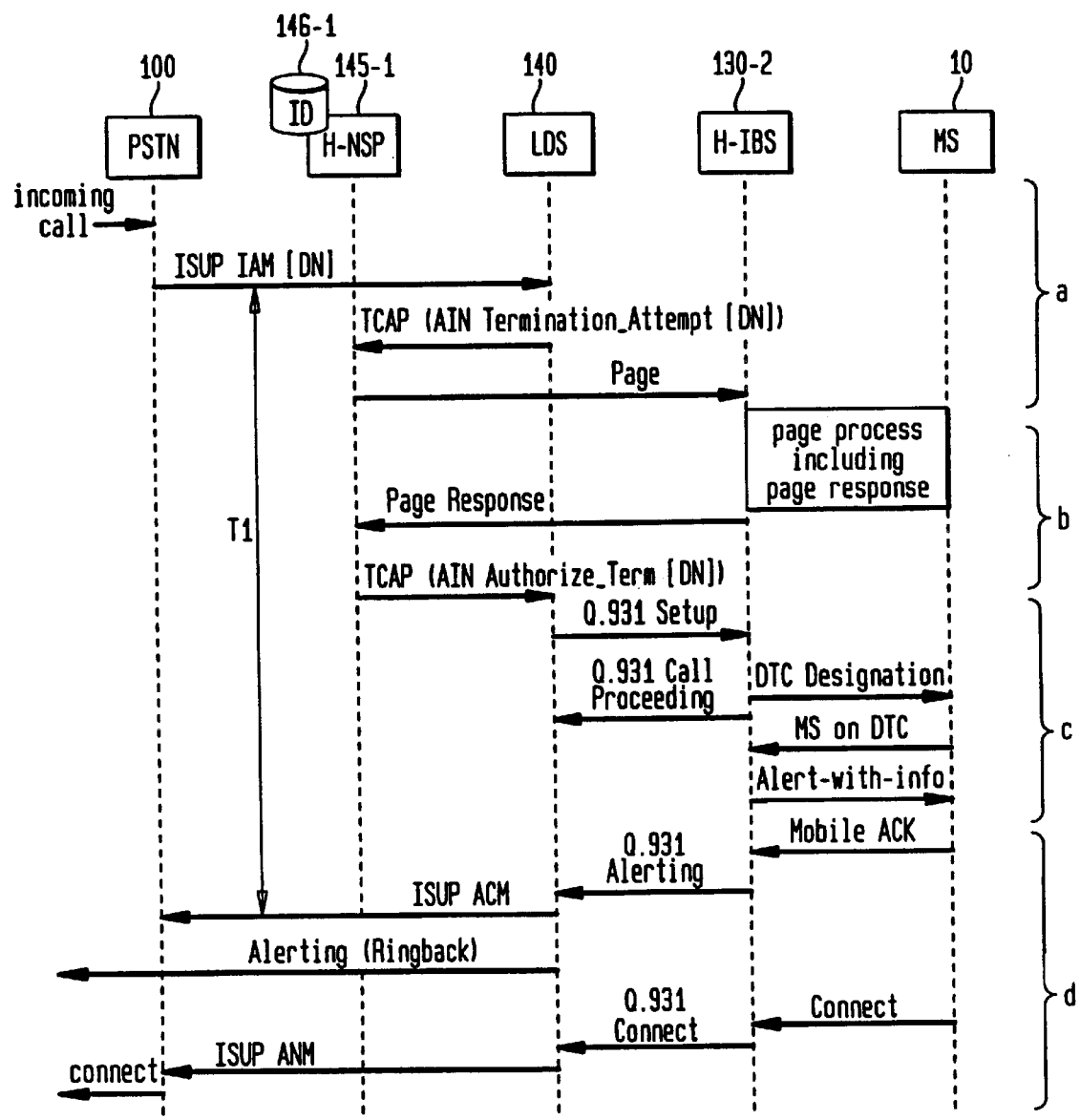
FIG. 5f shows an exemplary call delivery for a DN-based subscriber using the Advance Intelligent Network triggers.

Referring to FIG. 5*f*, step "a", a PSTN user dials a LCS subscriber's DN. The LDS 140 receives the ISUP IAM message from PSTN. The incoming call to a TAT provisioned DN directs the LDS 140 to request for routing instructions from H-NSP. H-NSP finds that the subscriber's MS is active in an IBS, and pages H-IBS, which pages MS 10.

In step "b", after the MS 10 responds to the page via H-IBS, H-NSP directs LDS to forward the call to the FDN of the serving IBS via a TCAP (AIN Authorize-Term).

In step c, LDS 140 sends Q.931 Setup message to the IBS. IBS sends Digital Traffic Channel (DTC) Designation message to MS 10 and sends Q.931 Call Proceeding message to the LDS. MS tunes to the traffic channel. IBS then detects the MS is on the traffic channel via DVCC status change. IBS 130 alerts the MS 10 and the MS 10 acknowledges.

In step "d", IBS 130 sends ISDN Alerting message to LDS. LDS 140 sends an ISUP ACM message to the PSTN and an alerting ringback to the calling mobile station. When the MS answers, IBS sends Q.931 Connect message to LDS. LDS then sends ISUP ANM message to PSTN switch and cuts through the voice path.

The Intra-Cell Mobile Assisted HandOff (MAHO)

There are two hand-offs possible in LCS service: an intra-cell mobile assisted hand-off (MAHO) and an inter-cell hand-off(for example, from an HNZ 105-1 to a VNZ 115-1 via a buffer zone). This section describes the end-to-end signaling flow scenario of Mobile Assisted HandOff (MAHO) between different RF channels within an IBS such as IBS 130-2 or cell such as home neighborhood zone (HNZ) 105-1.

In this invention, the preferred method is to use the radio frequency self-configuration algorithms as described above, which may be implemented in the LCS network system to utilize the available RF channels that are not used by the primary macro-cellular system (represented by WS cell 101-2 in FIG. 1) for intra-cell hand-off. However, such a radio frequency self-configuration is an option and not mandatory for this invention.

When the LCS system does use a radio frequency self configuration algorithm, whenever the. primary system starts to use the same RF channel, the radio in the LCS system and the active user may be required to move to another RF channel through the assistance of the RF self-configuration subsystem. As already described, each zone in a LCS system preferably has only one IBS 130. Once a RF channel is determined as noisy (e.g., from data received signal strength, RSSI, and/or the bit error rate), all the TDMA time slots within the channel may be considered to be noisy. In the intra-cell handoff scenario, therefore, all the active mobile stations using the noisy channel would re-tune to a new frequency.

Intra-cell handoff is attempted when the BER is high (bad) and the RSSI is good. (The threshold values for the BER and the RSSI may be provided by the RF Self-configuration subsystem). Upon receiving the request from the IBS 130 when handoff is needed, the RF Self-configuration subsystem may perform a calculation and return a new carrier frequency to the IBS 130 and the active MSs to re-tune to, or it may return a reject message when no carrier is available. If a new channel is available, the IBS 130 must re-tune to that new channel before the MS 10 does.

When no new channel is available for the intra-cell handoff (i.e., the intra-cell handoff attempt has failed) but the RSSI from a.neighboring IBS 130 is acceptable, the LCS system may attempt to handoff the active MSs to the neighboring IBS (V-IBS) 130 through intra-NSP handoff procedures (described in the next section).

If no channel is available for the handoff and the RSSI and BER measurement results of the current channel reach threshold values, the call may be dropped. The MS 10 may be capable of performing the IS-136 channel measurement (RSSI and BER) procedures. Units of RF measurement used by the MS .10 can be normalized by the IBS 130 if they are not consistent with IBS RF measurement units. DTX Control is disabled (Discontinuous Transmission not supported). The IS-136 Channel Quality messages are sent over the SACCH.

The carrier channels may always be turned on even when the channel is not currently used by any MS. Therefore, it is possible for the MS 10 to perform channel measurement on these channels. No reconfiguration of the ISDN connection as a result of the intra-cell handoff is necessary.

Figure 6A:
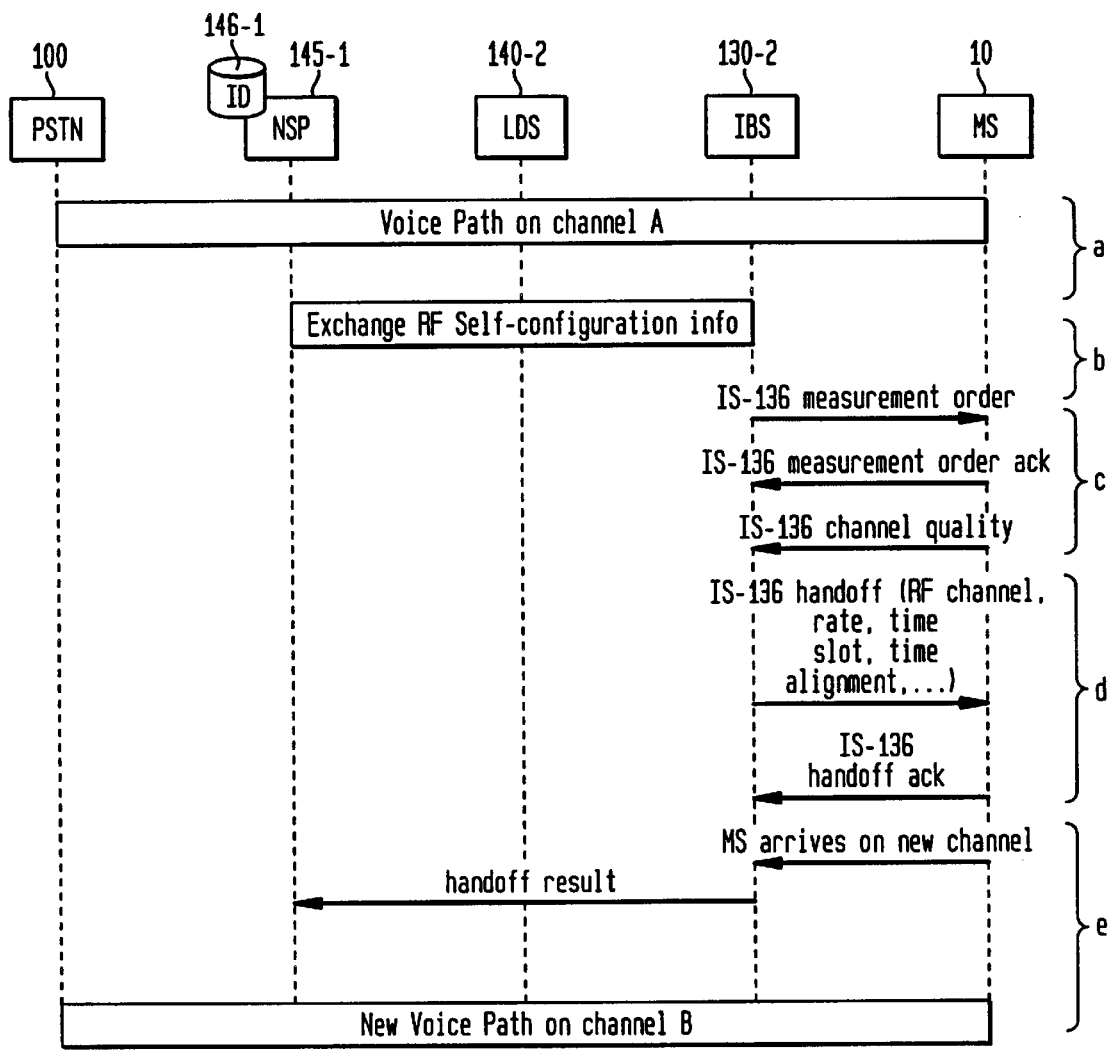
FIG. 6a shows an exemplary intra-cell call hand-off.

Referring to FIG. 6a, step "a," an active call between the MS 10 and the PSTN user (or another MS user) involving an LDS (for example, LDS 140-2) and an IBS, such as IBS 130-2 is in progress using air interface channel A.

In step "b," the RF Self-configuration subsystem in the IBS 130-2 performs an RF Self-configuration algorithm and exchanges information with other IBSs (in the present example, IBS 130-1) in the subscribed-to zones.

In step "c," based on the information collected by the algorithm, the RF Self-configuration the subsystem determines which RF channels have to be measured by the MS. The IBS 130-2 sends the Measurement order (over the FACCH) to the registered MS 10. The MS 10 acknowledges the instruction by sending the Measurement order ACK message back to the IBS 130-2 (over the FACCH). The MS 10 follows the MAHO procedures defined in the IS-136.2 specification and sends channel quality message to the IBS 130 (over the SACCH) in response to the Measurement order message.

In step "d," when the IBS 130-2 detects an intra-cell handoff condition based on the received channel quality message (i.e., BER and RSSI), the IBS 130-2 sends an intra-cell handoff request for a new channel to the RF Self-configuration subsystem. The subsystem performs a calculation and/or sends a new carrier frequency information to the IBS 130-2. Upon receiving the information, the IBS 130-2 sends a handoff command, in accordance with the IS-136.2 specification, to the MS (over the FACCH) requesting the MS to re-tune to a new RF channel (along with other channel assignment information). Handoff ACK is sent by the MS (over the FACCH). Responsive to receiving the acknowledgment from the MS, the IBS 130-2 re-tunes to the new RF (channel B).

In step "e," the MS turns off its transmitter, adjusts its power level tunes to a new RF channel b, sets stored DVCC to the DVCC information element of the handoff message, sets the transmit and receive rate to that indicated by the Rate information element, and sets the time slot to that indicated by the Timeslot Indicator information element. Once synchronized, the MS turns on its transmitter. The IBS 130-2 then detects that the MS 10 is on the new channel via DVCC status change. Upon detecting the MS 10 on new channel, the IBS 130-2 sends Handoff Result messages to the NSP 145-1. The handoff is completed, and the call continues.

An Intra-NSP Inter-cell MAHO (HNZ to Contiguous VNZ or VNZ to Contiguous VNZ))

When an active call is in progress, the MS measures the neighboring setup channels and the current active channel for RSSI and BER among other things. These IS-136 Channel Quality measurements help the system determine if the MAHO procedure is necessary to preserve the call. Furthermore, in order to perform a smooth, lossless handoff between the IBSs, LCS uses the Directed Call Pickup (DPU) with Barge-in feature of the LDS 140. DPU establishes a three-way call without disturbing the current call.

Figure 6B:
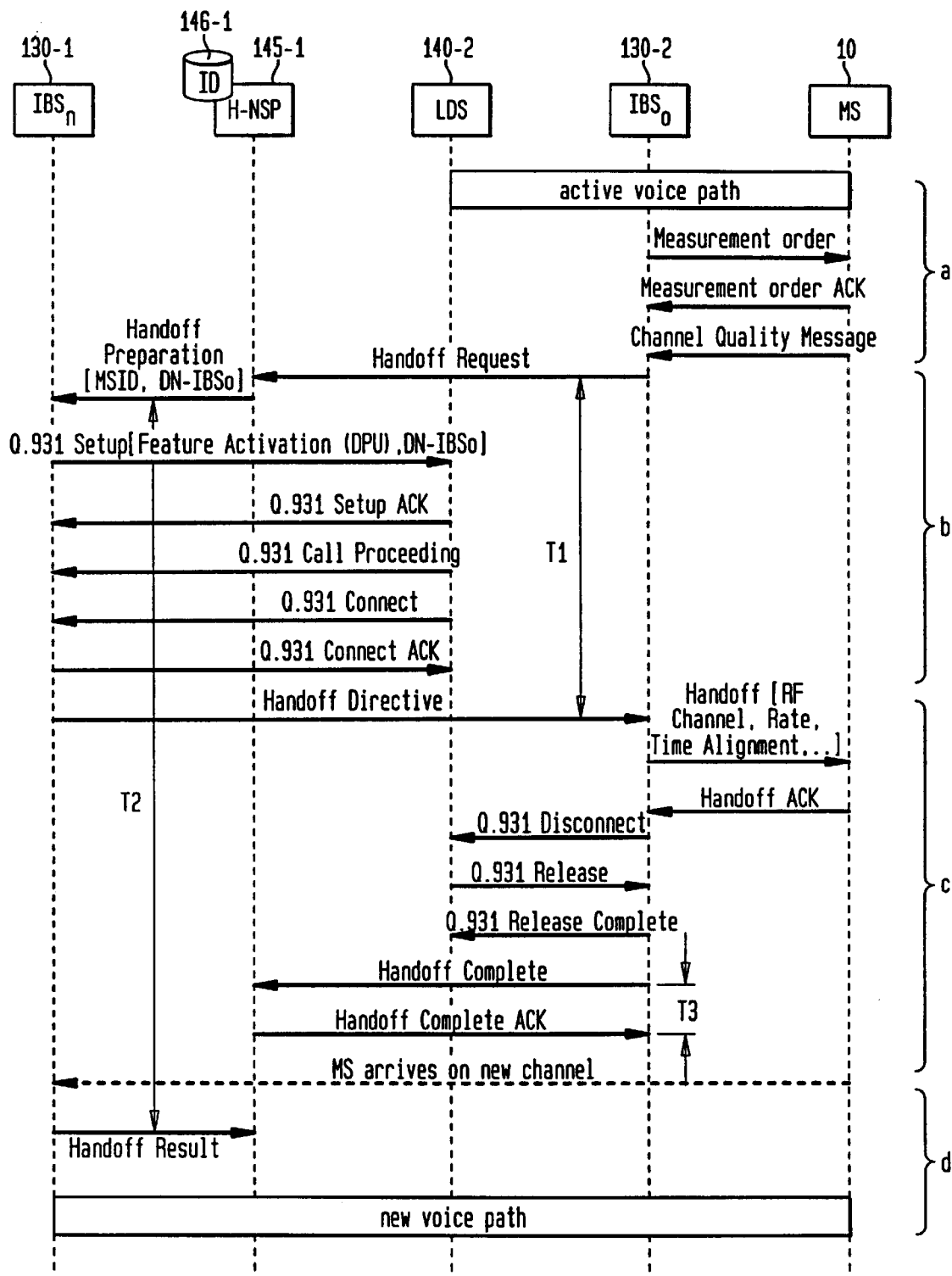
FIG. 6b shows an exemplary inter-cell call hand-off within, for example, NSP 145-1.

Referring to FIG. 6b, step "a," a mobile station is on an active call. H-IBS 130-2 directs the MS to start measuring the channel quality of the neighboring control channels and the current channel. The MS acknowledges the order and starts sending the IS-136 Channel Quality messages.

In step "b", when H-IBS 130-2 detects a handoff condition based on the received channel quality messages (a low threshold value is reached), the H-IBS 130-2 sends a handoff request message. This message includes a priority list of the neighboring IBSs (V-IBS) such as V-IBS 130-1 along with the serving mobile MSID to the H-NSP 145-1. H-IBS 130-2 also starts the handoff request timer (T1). Once the H-NSP 145-1 receives the handoff request message, the H-NSP 145-1 will start at the top of the neighboring IBS (V-IBS) list and check the radio channel and B-channel availability of each entry. When an available neighboring IBS (V-IBS), such as V-IBS 130-1 is found, H-NSP 130-2 will request the V-IBS 130-1 to prepare for a handoff for the MS (MSID) and starts timer T2. In response, the V-IBS 130-1 will reserve the B-channel and the RF resources and start to initiate a three-way call using the directed call pickup with barge-in. IBSN sends a Q.931 Setup message to LDS 140-2 that includes a feature activation code for DPU and the DN for the IBS 130 to barge-in upon, $IBS_o$. $IBS_n$ 130-1 then waits for the LDS to indicate that the call has connected to $IBS_o$ 130-2 via Q.931 set up ACK, Q.931 call Proceeding and Q.931 Connect. IBSN 130-1 then sends a Handoff Directive to $IBS_o$ 130-2 to inform the IBS that $IBS_n$ 130-1 has successfully established a three-way call (DPU) as well as sending a Q.931 Connect ACK to LDS 140.

In step "c", after receiving the Handoff Directive, $IBS_o$ 130-2 cancels timer T1. $IBS_o$ sends an IS-136 Handoff order to the MS requesting it to retune to the new RF channel on $IBS_n$ 130-1. After the MS acknowledges the order, $IBS_o$ 130-2 starts to release the ISDN B-channel via Q.931 disconnect. LDS 140-2 returns a Q.931 release to $IBS_o$ 130-2, which then sends Q.931 release complete to LDS 140-2. Simultaneously $IBS_o$ 130-2 informs H-NSP 145-1 that it has completed the handoff to the new IBS, $IBS_n$ 130-1. H-NSP 145-1 acknowledges this notification. In step "d", when the MS arrives on the new channel, detected by $IBS_n$ 130-1 by the DVCC status change, $IBS_n$ 130-1 sends a Handoff Result message to H-NSP 145-1. H-NSP 145-1 notes that the handoff is completed to the new IBS and cancels timer T2. Voice path is established via a new route and the call continues.

Call Processing for an LCS Subscriber Who Makes an Outgoing Call

This section describes the signaling flow scenario for a call originated by the LCS subscriber from a subscribed-to neighborhood zone.

Figure 7:
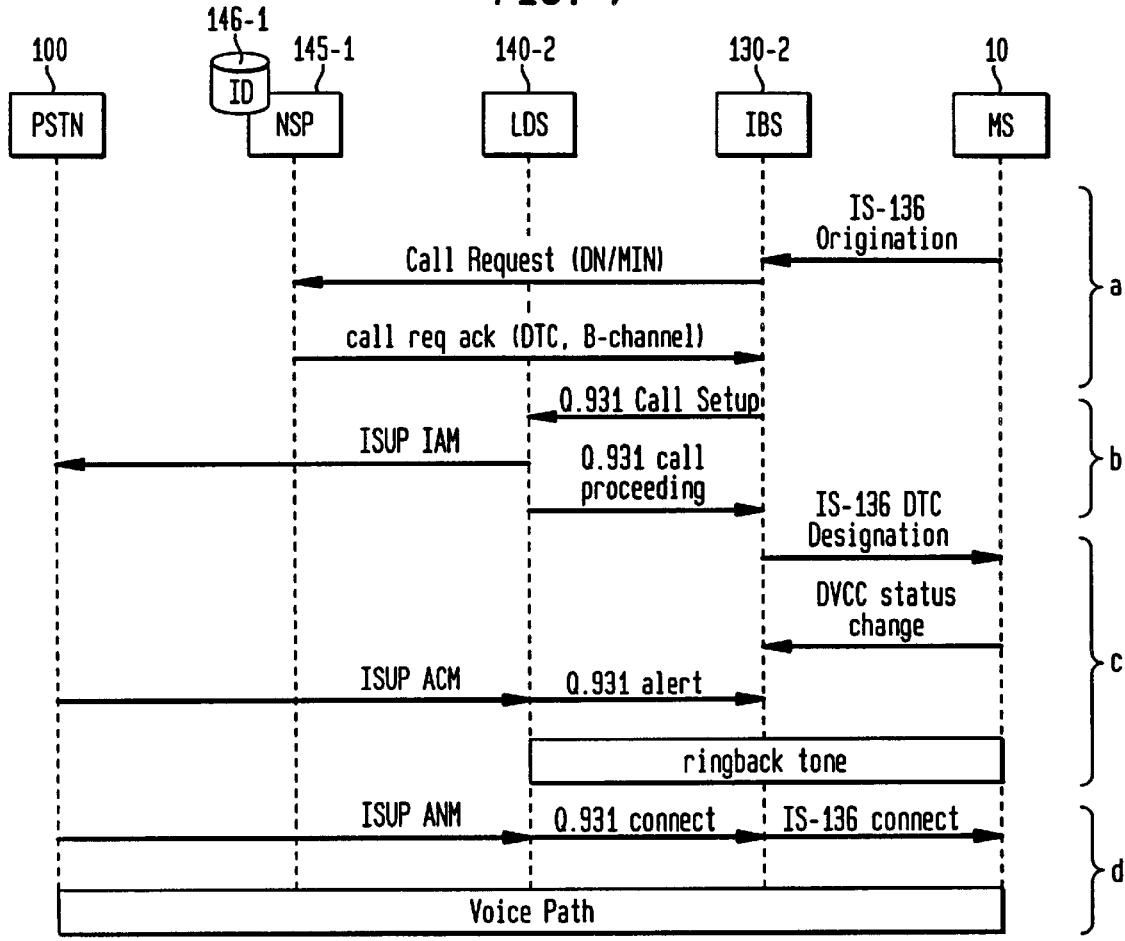
FIG. 7 shows an exemplary outgoing call from a LCS subscriber from a registered zone.

Referring to FIG. 7, step "a," the subscriber, for example, subscriber 10 in HNZ 105-1 dials a number on the MS; the MS sends an IS-136 origination message to the serving IBS 130-2. The IBS 130-2 sends a call request message to the NSP 145-1 to validate the call. The NSP 145-1 may initiate an authentication procedure via AC 190 when necessary. The NSP 145-1 validates the MS via its associated Intelligent Database (ID) 146-1. If the resources are available, it reserves a B-channel and DTC, and sends a call req ack message to the IBS 130-2 with the resource information. If no resources are available, NSP 145-1 send a call req nack and the IBS 130-2 rejects the call.

In step "b" the IBS 130-2 sends a Q.931 call setup message to the LDS 140-2. The LDS 140-2 sends an ISUP IAM message to the destination switch in the PSTN 100 to initiate end-to-end connection. The LDS 140-2 sends a Q.931 call proceeding message to the IBS 130-2 to connect the B-channel to the LDS 140-2.

Finally, in step "d," the LDS 140-2 receives an ISUP ANM message from the PSTN switch 100 when the destination user finally answers. The LDS 140-2 sends a Q.931 connect message to the IBS 130-2 to complete the end-to-end connection. The IBS 130-2 sends an IS-136 connect message to the MS and the voice path is established, thus completing the outgoing call process.

Thus, there has been described a complete system for providing a new local cordless-type services where a mobile subscriber may receive and make free calls within their subscribed-to neighborhood zones.

All United States patents referred to herein should be deemed to be incorporated by reference as to their entire contents. The following copending patent applications, which have each been filed on the same day as the present application, are hereby incorporated by references as to their entire contents.

U.S. patent application Ser. No. 09/223,322, entitled "Neighborhood Residential Cordless Services," invented by A. Chow et al.

U.S. patent application Ser. No. 09/223,320, entitled "Automatic Status Indicators for Neighborhood Cordless Services," invented by A. Chow et al.

U.S. patent application Ser. No. 09/223,321, entitled "Automatic Service Selection Feature," invented by A. Chow et al.

U.S. patent application Ser. No. 09/223,317, entitled "Method for Billing Subscribers With Neighborhood Cordless Residential Service," invented by A. Chow et al.

U.S. patent application Ser. No. 09/223,316, entitled "Neighborhood Residential Cordless Service Call Handoff With Call Barging," invented by A. Chow et al.

What we claim is:

1. A method of initiating a local cordless-type service to a subscriber having a mobile station for communicating with a radio base station serving a plurality of said subscribers to said service comprising the steps of:

collecting subscriber profile data at a network server platform and associated database, said subscriber profile data including a unique manufacturer electronic serial identification number of said mobile station;

receiving subscriber selection criteria of at least one selected zone, said radio base station for radiating and receiving radio frequency signals for communication with mobile wireless subscriber apparatus; and responsive to receiving a wireless communication from said subscriber from said one selected zone, actuating said local cordless-type service over-the-air.

2. A method of initiating a local cordless-type service as recited in claim 1 further comprising the steps of:

receiving subscriber selection criteria of a selected second zone, said selected second zone overlapping said at least one selected zone; and billing an additional fixed rate per service period for using said mobile subscriber apparatus when said mobile subscriber apparatus is located within one of said at least one selected zone and said selected second zone.

3. A method of initiating a local cordless-type service as recited in claim 1 further comprising the steps of:

receiving subscriber selection criteria of a selected second zone, said selected second zone being located remote from said at least one selected zone; and billing an additional fixed rate per service period for using said mobile subscriber apparatus when said mobile subscriber apparatus is located within one of said at least one selected zone and said selected second zone.

4. A method of initiating a local cordless-type service as recited in claim 2 further comprising the step of:

collecting point-of-sale data at said network server platform at the time of purchase by said subscriber of said mobile station including said unique manufacturer electronic serial identification number.

5. A method of initiating local cordless-type services as recited in claim 3 further comprising the step of:

comparing said point-of-sale data with data obtained by a provider of said local cordless-type service during a registration process.

6. A method of initiating a local cordless-type service to a subscriber having a mobile station for communicating with a radio base station serving a plurality of said subscribers to said service comprising the steps of:

collecting subscriber profile data at a network server platform and associated database, said subscriber profile data including their selection of one of their current directory number, a new mobile identification number and their current mobile identification number;

generating a feature code comprising a unique data word;

receiving subscriber selection criteria of at least one selected zone, said radio base station for radiating and receiving radio frequency signals for communication with mobile wireless subscriber apparatus; and responsive to receiving a wireless communication including said feature code from said subscriber from said one selected zone, actuating said local cordless-type service over-the-air if said included feature code matches said generated feature code.

7. A method of initiating a local cordless-type service as recited in claim 6 further comprising the steps of;

receiving subscriber selection criteria of a selected second zone, said selected second zone overlapping said at least one selected zone; and billing an additional fixed rate per service period for using said mobile subscriber apparatus when said mobile subscriber apparatus is located within one of said at least one selected zone and said selected second zone.

8. A method of initiating a local cordless-type service as recited in claim 6 further comprising the steps of:

receiving subscriber selection criteria of a selected second zone, said selected second zone being located remote from said at least one selected zone; and billing an additional fixed rate per service period for using said mobile subscriber apparatus when said mobile subscriber apparatus is located within one of said at least one selected zone and said selected second zone.

9. A method of initiating a local cordless-type service as recited in claim 7 further comprising the step of:

collecting point-of-sale data at said network server platform at the time of purchase by said subscriber of said mobile station including said unique electronic serial identification number.

10. A method of initiating a local cordless-type service as recited in claim 6 further comprising the steps of:

establishing a personal identification number during a registration process; and actuating said local cordless service only if an entered personal identification number matches said established personal identification number.

11. A method as recited in claim 6 further comprising the step of downloading a number assignment module responsive to said subscriber profile data prior to actuating local cordless-type service.

12. A method as recited in claim 6 wherein said unique data word comprises a unique sequence of bits, a personal identification number entered by a subscriber and a manufacturer electronic serial number of said mobile station.

13. A method for initiating a neighborhood cordless service to a subscriber having a mobile station, comprising the steps of:

requesting from the subscriber an indication, said indication being whether the subscriber wishes to disconnect existing wired service and reuse a directory number associated with the wired service for use with the mobile station, said mobile station in communication with a radio base station, said radio base station further in communication with a local digital switch;

receiving subscriber selection criteria of at least one selected zone; and responsive to receiving a wireless communication from said subscriber from said at least one selected zone, actuating the neighborhood cordless service.

14. A method for initiating a neighborhood cordless service to a subscriber having a mobile station for communicating with a radio base station serving a plurality of said subscribers to said service, comprising the steps of:

receiving subscriber selection criteria of at least one selected zone;

generating a feature code;

the radio base station receiving from the mobile station a message from said subscriber from said at least one selected zone including the feature code;

the radio base station forwarding the message via a local digital switch to a network server platform;

the network server platform comparing the feature code with stored data; and the network server platform validating the mobile station responsive to an outcome of the comparison of the feature code with the stored data and actuating the neigborhood.

15. The method of claim 14, further including the step of forwarding a number assignment module to the mobile station if an outcome of the comparison of the feature code with the stored data results in a match.

* * * * *